(12) United States Patent
Maria

(10) Patent No.: US 10,492,078 B2
(45) Date of Patent: Nov. 26, 2019

(54) SHARED SPECTRUM BROKER

(71) Applicant: AT&T Mobility II LLC, Atlanta, GA (US)

(72) Inventor: Arturo Maria, Bellevue, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 98 days.

(21) Appl. No.: 15/478,868

(22) Filed: Apr. 4, 2017

(65) Prior Publication Data

US 2018/0288622 A1  Oct. 4, 2018

(51) Int. Cl.
*H04W 16/14*  (2009.01)
*H04W 12/06*  (2009.01)
*G06F 21/44*  (2013.01)
*H04L 29/06*  (2006.01)

(52) U.S. Cl.
CPC ............ *H04W 16/14* (2013.01); *G06F 21/44* (2013.01); *H04L 63/0853* (2013.01); *H04W 12/06* (2013.01)

(58) Field of Classification Search
CPC ..... H04L 5/0007; H04L 5/003; H04L 1/1812; H04L 27/26; H04L 2209/80; H04L 45/125; H04L 47/805; H04L 5/1469; H04L 65/1059; H04L 65/1069; H04L 67/1002; H04L 9/32; H04L 41/0226; H04L 47/10; H04L 47/11; H04L 63/0853; H04W 84/045; H04W 4/02; H04W 72/082; H04W 16/08; H04W 16/16; H04W 48/04; H04W 52/265; H04W 52/367; H04W 12/08; H04W 16/10; H04W 28/20; H04W 40/12; H04W 40/125; H04W 48/08; H04W 72/1226; H04W 16/14; H04W 72/042; H04W 72/0453; H04W 84/18; H04W 88/10; H04W 88/06; H04W 24/08; H04W 24/10; H04W 28/08; H04W 72/085; H04W 76/11; H04W 72/02; H04W 76/10; H04W 84/12; H04W 72/08; H04W 72/10; H04W 74/02; H04W 74/0808; H04W 12/06; G06F 21/44

See application file for complete search history.

(56) References Cited

U.S. PATENT DOCUMENTS

| | | |
|---|---|---|
| 8,892,109 B2 | 11/2014 | Panchal et al. |
| 9,088,973 B1 | 7/2015 | Freen et al. |
| 9,129,343 B2 | 9/2015 | Stanforth et al. |
| 9,148,792 B2 | 9/2015 | Arefi et al. |
| 9,185,556 B2 | 11/2015 | Hughes |
| 9,220,013 B2 | 12/2015 | Solondz |
| 9,374,827 B2 | 6/2016 | Rashid et al. |
| 9,491,752 B2 | 11/2016 | Damnjanovic et al. |
| 9,516,549 B1 | 12/2016 | Aksu |
| 9,554,416 B2 | 1/2017 | Mueck et al. |
| 2013/0295946 A1* | 11/2013 | Panchal ............... H04W 16/14 455/452.1 |

(Continued)

OTHER PUBLICATIONS

Ryan et al.; "A New Pricing Model for Next Generation Spectrum Access"; Proceedings of the first Int'l Workshop on Technology and Policy for Accessing Sprectrum; 2006; 8 pages.

*Primary Examiner* — Christopher M Brandt
*Assistant Examiner* — Jing Gao
(74) *Attorney, Agent, or Firm* — BakerHostetler

(57) ABSTRACT

Systems and methods network broker to facilitate use of and compatibility with shared access systems.

20 Claims, 12 Drawing Sheets

(56) References Cited

U.S. PATENT DOCUMENTS

| | | |
|---|---|---|
| 2015/0223069 A1* | 8/2015 | Solondz ................ H04W 12/08 |
| | | 370/329 |
| 2015/0245374 A1 | 8/2015 | Mitola, III et al. |
| 2015/0319314 A1 | 11/2015 | Miller et al. |
| 2015/0358968 A1 | 12/2015 | Malladi et al. |
| 2016/0212626 A1 | 7/2016 | Simon et al. |
| 2017/0188241 A1* | 6/2017 | Mueck .................. H04W 16/14 |

* cited by examiner

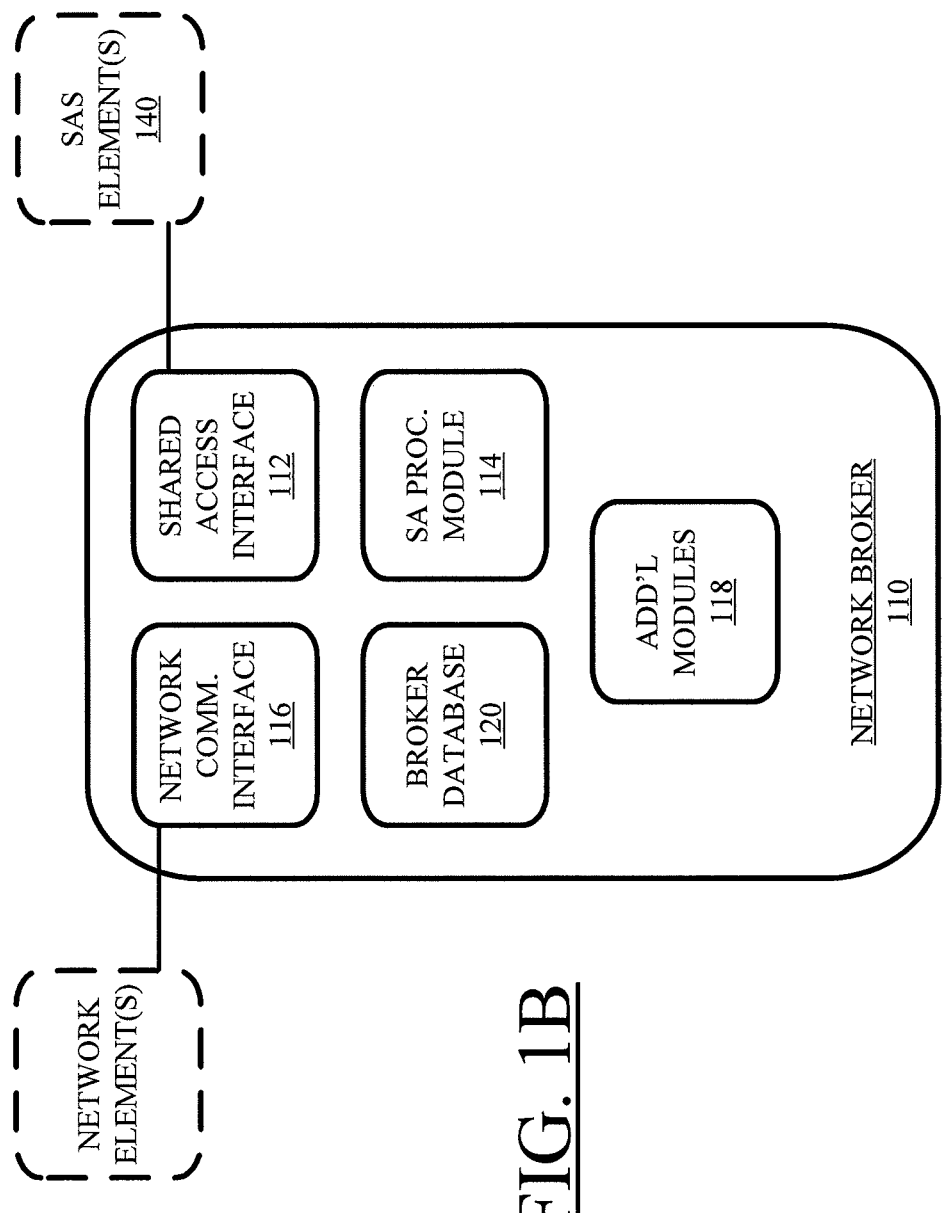

SHARED SPECTRUM BROKER

TECHNICAL FIELD

This disclosure relates generally to network management and, more specifically, to assigning and configuring networks and network elements to support shared access systems.

BACKGROUND

Various regulatory bodies control the use of signal frequencies and blocks of frequencies as spectrums. Some spectrums are dedicated to certain entities. For example, regulatory bodies dedicate certain frequency bands for distinct applications such as radar, radios, et cetera. However, as the use of wireless communications continues to grow, it may become desirable to employ spectrums in a more efficient way and increase their utilization. For instance, regulatory bodies may find it desirable to share spectrums among disparate groups of users.

To do so, however, it will be necessary to develop technology that implements spectrum sharing while remaining interoperable with legacy connectivity standards.

SUMMARY

In embodiments, a system comprises a network communication interface configured to communicate with a public network and a private network, wherein the public network and the private network are configured to operate using a shared frequency. The system further comprises a network broker database configured to store a network element profile for a shared access network element configured to operate on the public network and the private network, wherein the shared access network element has a home network distinct from the public network and the private network. The system further comprises a shared access processing module configured to authenticate the shared access network element the public network and the private network based on the network element profile.

In embodiments, a method comprises receiving a shared access request from a network element among shared access network elements configured to operate on a public network and a private network, wherein the shared access request is to associate the network element with at least one of the public network and the private network, and wherein the shared access network element has a home network distinct from the public network and the private network. The method further comprises searching a network broker database for a network element profile associated with the network element and authenticating the network element to at least one of the public network and the private network based on the network element profile.

In embodiments, a system comprises means for receiving a shared access request from a network element among shared access network elements configured to operate on a public network and a private network, wherein the shared access request is to associate the network element with at least one of the public network and the private network, and wherein the shared access network element has a home network distinct from the public network and the private network. The system further comprises means for searching a network broker database for a network element profile associated with the network element and means for authenticating the network element to at least one of the public network and the private network based on the network element profile.

These and other embodiments are described in greater detail elsewhere herein.

BRIEF DESCRIPTION OF THE DRAWINGS

In the following description, for purposes of explanation, numerous specific details are set forth in order to provide an understanding of the variations in implementing the disclosed technology. However, the instant disclosure may take many different forms and should not be construed as limited to the examples set forth herein. Where practical, like numbers refer to like elements throughout.

FIG. 1B illustrates a block diagram of an example network broker utilized with the network of FIG. 1A and other aspects herein.

DETAILED DESCRIPTION

Aspects herein disclose a spectrum management entity broker for managing various network elements in conjunction with shared access systems for conditional use of regulated frequency spectrums and interoperability between public and private networks utilizing shared frequencies.

Future wireless radio access network interfaces will include "shared spectrum." Regulatory entities are expected to allow some or all of spectrums, which are currently dedicated to one group of users, e.g., military incumbents, to be utilized by another group of users. However, because the incumbent users may still require priority use of these spectrums, or portions thereof, to maintain security, operational feasibility, and so forth, regulatory entities may make sharing contingent upon a variety of conditions.

Shared access system environments and architecture will utilize various network nodes and elements to facilitate communications (using, e.g., databases, push or pull information, application programming interfaces (APIs), websites) that will provide data necessary for operation in an SAS environment through network elements out to edge nodes (e.g., access points such as eNodeBs). Various intermediary network elements can receive, use, transmit, and/or transform shared access system data prior to it being received and used at a particular network location.

While aspects hereafter illustrate example computing environments, it is understood that non-standard computing and computer science assets are contemplated by the disclosure. To use specialized interfaces to SAS data sources, access points, and various network elements, coupled with dynamic security filters and firewalls to protect both the SAS data source(s) and various network elements, that environment-specific hardware and code may be employed for implementation.

While various aspects herein may be referred to as existing within particular domains, subdomains, networks, et cetera, it is understood that elements can be utilized in alternative portions of environments described. For example, while aspects may be described as core network elements or regional network elements, functionality for one can generally, mutatis mutandis, be implemented in the other where relevant, including (but not limited to) their use as virtualized instances having similar modules.

Figure 1A:
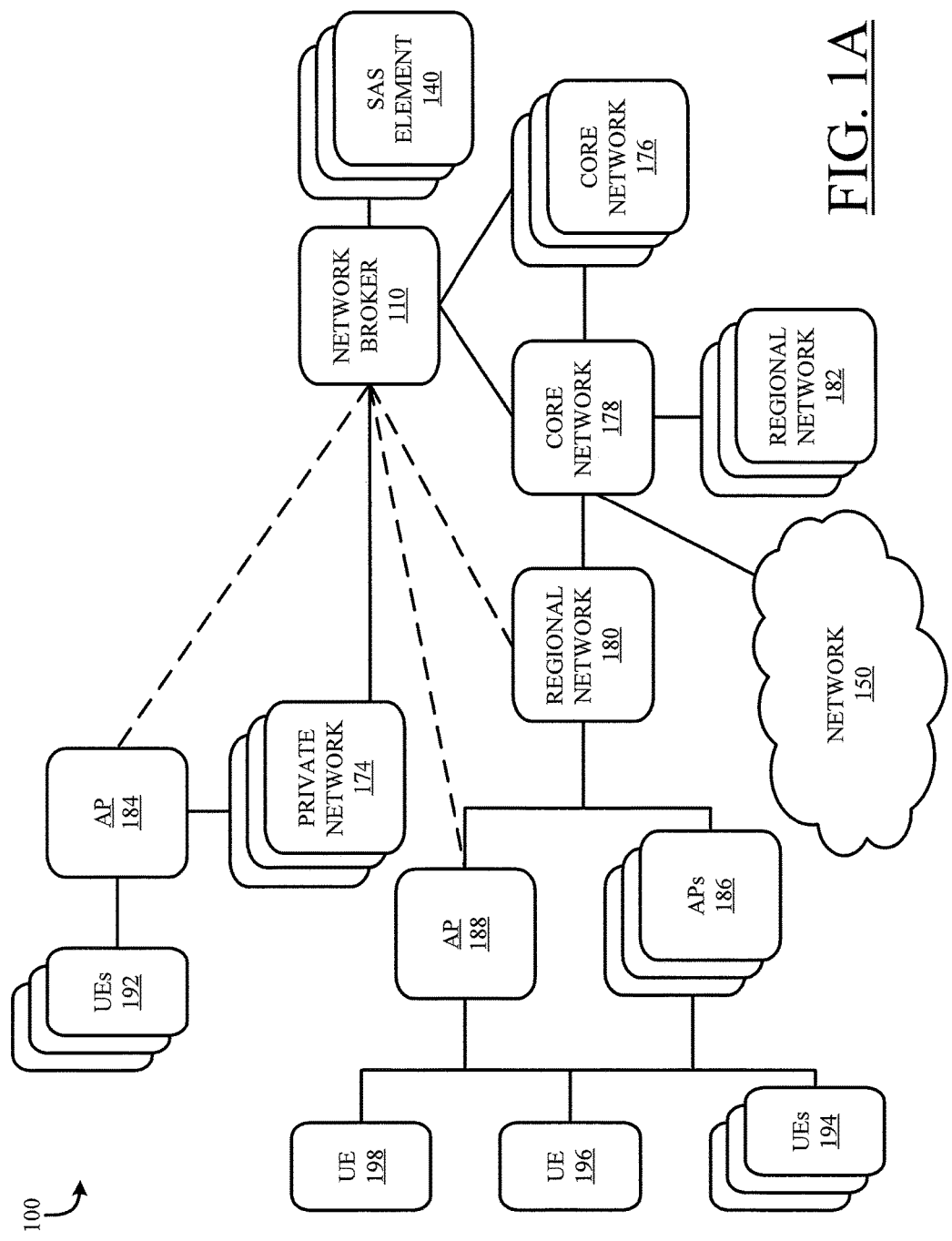
FIG. 1A illustrates a block diagram of an example network employing aspects of the disclosure herein.

FIG. 1A illustrates example system 100 for connecting users to network 150 such as the Internet in accordance with aspects herein. System 100 in one example includes various user equipment 192, 194, 196, and 198 which can connect to one of a plurality of access points 184, 186, and 188. Access points 186 and 188 provide connectivity to one of a plurality of regional networks 180 and 182, or in alternative or complementary embodiments may be connected directly to one of a plurality of core networks such as core networks 176 or 178. Regional networks 180 and 182 connect to core network 178. Core networks 176 and/or 178 can be a core to a carrier network providing connectivity to network 150 (e.g., via a gateway of core network 178), which can be the Internet or other networks outside the carrier network of core network 178. In alternative or complementary embodiments, some of plurality of regional networks 180 and 182 can also connect to non-carrier networks such as private networks 174. Access point 184 provides connectivity to private networks 174, which can be, e.g., private LTE networks as described herein. In embodiments, private network 174 may have a direct gateway to network 150 (e.g., the Internet), or may utilize a gateway through other elements (e.g., network broker 110).

As not all elements of FIG. 1A are illustrated in similar detail, it is understood that core networks 176 can include aspects similar to those of core network 178, and regional networks 182 can include aspects similar to those of regional network 180. While system 100 is shown having carrier networks comprised of, e.g., core networks 176 and 178, as well as private networks 174, it is understood that any number of networks or network regions can be utilized in any combination without departing from the scope or spirit of the innovation. More, FIG. 1A the network arrangement diagrammed in FIG. 1A shows some aspects associated with a LTE carrier network arrangement as well as new aspects concerning shared spectrum networks, but it is understood that this is for purposes of example and explanation only, and aspects herein can operate in various environments with or without core networks 176 and 178, regional networks 180 and 182, private networks 174, et cetera.

For purposes of understanding, a "network element" can include any individual hardware or virtual component or group of components illustrated or included within the illustration. Thus, in FIG. 1A, UEs 192, 194, 196, and 198 are network elements, as are APs 184, 186, and 188. Networks 174, 176, 178, and/or 180, and/or portions thereof, can be referred as a "network element" to either indicate some or all of the elements therein, or various administration aspects which manage the network itself. Further, example "network elements" can also include elements not illustrated but understood to participate in network functionality, such as, e.g., a mobility management entity or various gateways within core networks 176.

Core network 176 (or others) can include a variety of network elements such as a mobility management entity, home subscriber server, authentication, authorization, and accounting server, various gateways (for providing connectivity and services as well as network administration), and a variety of additional elements to provide core network environment functionality or proprietary capabilities. Similar network elements may also exist in, e.g., regional network(s) 180 and 182.

Subscriber identity modules (SIMs) are used by carrier networks (e.g., regional networks 180 and 182 and core networks 176 and 178) to identify and authenticate subscribers on carrier networks. For example, UEs 194, 196, and 198 may use SIMs. SIMs are typically coded to a home network (e.g., the network which a user possessing LTE-enabled user equipment subscribes) but also include information to facilitate roaming on non-home networks (e.g., outside their carrier). For example, a SIM associated with UE 198 can be coded to or otherwise associated with a carrier network associated with core network 178, which can be a home network of UE 198 for purposes of this example. Within public or carrier networks, transitions between home and non-home networks validate the subscriber using home subscriber server (HSS) profiles and communication with the subscriber's home carrier network. A temporary profile is then created by the roaming carrier to support the network session. Thus, if UE 198 is coded to network 178 (its home network) and wishes to transition from its core network 176 which is operated by another carrier, temporary profiles can be exchanged between respective HSSs. However, the present disclosure provides for access or roaming capability among networks or their access points in shared spectrum environments through providing a network infrastructure to support such functionality.

In accordance with discussion herein, private, non-carrier networks (e.g., private networks 174) can be operated by their owners and added to a multi-network roaming scheme through the use of shared spectrum access. "Private networks" described herein are not described as "private" in the sense of exclusivity, but rather based on ownership and operation by entities who are not regulatory or governmental authorities, or carrier network entities. For example, private networks 174 sites can be private LTE sites owned or operated by, e.g., a retail facility, a business office, an airport, a private home, or others who do not license portions of the spectrum for operating carrier networks in the manner of carrier service providers. (For example, in the United States, carriers license bands in the 700 MHz, 800 MHz, 850 MHz, 1.7 GHz, 1.9 GHz, 2.1 GHz, 2.3 GHz, and 2.5 GHz bands to operate 4G LTE carrier networks).

Private networks 174 may be deployed using unlicensed (e.g. GAA) or lower-investment shared frequencies. For example, shared access can be provided on one or more frequencies in the 3.5 GHz spectrum. While Incumbent Access remains in place, sharing of these frequencies also establishes non-incumbent tiers of access including Priority Access Licensees (PALs) and General Authorized Access (GAA) users, the latter paying no fee for use of the frequencies. Using these and other access techniques in a shared spectrum, private networks 174 can include access points 184 (e.g., private eNodeBs) and may include their own gateways or leverage shared gateways. Individual user devices can authenticate to their own private systems for access. While carrier subscribers still authenticate to their own carrier network (e.g., through the carrier HSS), this may not provide full utilization of non-carrier networks.

As discussed, with the changes fostered by implementation of shared spectrum technologies and introduction of private networks 174 utilizing shared frequencies, carrier HSS profiles will be insufficient to manage interoperability among roaming devices. The conditional nature of access to shared frequencies adds another requirement to shared spectrum technologies. To support the shared spectrum architecture, a network broker is disclosed. Network broker 110 may be utilized to support identification, authentication, and ultimately connection compatibility between devices crisscrossing carrier networks (e.g., regional networks 180 and 182 and core networks 176 and 178) and private LTE sites such as private networks 174. Network broker 110 provides a management element independent of traditional carrier networks (supporting, e.g., regional networks 180 and 182 and core networks 176 and 178) to coordinate use of shared frequencies and coordinate subscriber access between networks utilizing shared frequencies. Network broker 110 can also be used as a conduit or controller for ensuring frequency conditions are observed (e.g., yielding to incumbent users) and mitigating or reducing frequency use conflicts and traffic concerns on shared frequencies when available. In various environments, there may be one or more network brokers 110 capable of coordinating action and information, as well as various agents or broker modules facilitating or enriching shared spectrum use.

Network broker 110 interacts with various networks (e.g., private networks 174, core networks 176 and 178, regional networks 180 and 182) and/or network elements to facilitate coordination between networks operating on shared frequencies. While network broker 110 is not shown as an element of any network, it can exist on, in, or distributed about one or more networks providing interfaces to other networks, network elements, and/or SAS elements for providing shared access data. In embodiments, two or more network brokers 110 can exist in, on, or about one or more networks and interact with one another to coordinate information and action.

Network broker 110 can receive a variety of inputs in managing portions of system 100. In the embodiment illustrated, shared access system elements 140 (which can include, e.g., various public or private information systems, sensors for detecting particular traffic on shared frequencies, and others) exist outside carrier and private networks but can interact with, e.g., network broker 110 to allow network broker 110 to manage networks and network elements based on information received from shared access system elements 140. Moreover, network broker 110 can receive input from various networks (e.g., private networks 174, core networks 176 and 178, regional networks 180 and 182, and others) and network elements (e.g., access points 184, 186, and 188, various elements of core networks 176 and 178 and regional networks 180 and 182, and others) to register entities and elements (e.g., UEs 192, access point 184, private network 174) among shared spectrum users (providing, e.g., functionality across multiple carrier and/or private networks including paging, authentication, location tracking, handover assistance, profile creation and storage, et cetera) and otherwise manage shared spectrum functionality.

Examples of network broker 110 behavior include managing a handoff between (to and/or from) a public/carrier network (e.g., regional network 180) and a private LTE site (e.g., private network 174), registering networks and network entities utilizing a shared spectrum to a database, propagating shared frequency change information from shared access system elements 140 or commands/instructions related thereto, de-conflicting the activities of various shared spectrum users, and so forth. Network broker 110 can be implemented as a dedicated server, as a distributed service among more than one computing device, and/or as a virtual machine or virtualized instance in accordance with network function virtualization (NFV).

Therefore, when an individual subscriber requests to move (e.g., selects network with which to associate) or is instructed to move (e.g., by way of a deliberate or automatic handoff) from a private LTE system to a carrier LTE system, the device, such as UE 192, may attempt to attach to the carrier network, such as regional network 180. However, if UE 192 is not a carrier-based device for which the carrier network is a home or known roaming network, the carrier may detect that UE 192 attempting to associate has a private SIM not registered to any carrier or no SIM at all.

Based on a determination that the SIM (or other identity or account information) is unknown to the carrier, the carrier can signal network broker 110. This signaling can be conducted using, e.g., the SS7 over IP protocol, a specialized shared spectrum broker IP protocol, or another network protocol.

Network broker 110 can receive the signal and identify the unknown SIM. In embodiments, the signal can include a request for authentication from the carrier. Based on information from broker database 120, described below, network broker 110 can validate UE 192 to a carrier.

Private LTE users or their private networks and devices can be automatically, semi-automatically, or manually registered with network broker 110 to facilitate interoperability. This can be dictated by use of the shared spectrum, through leveraging different accounts or UE/network information, through a registration process (e.g., using various web pages, applications, human communications, et cetera). Profiles and other information created or stored in broker database 120 can include carrier account information (or carrier-type account information), payment information, et cetera, to ensure accountability and payment of any roaming charges. Reciprocity agreements can also be created between various private and/or carrier networks.

Provided the conditions for association with the network are met—including but not limited to, e.g., identity, payment information, and/or agreements—UE 192 can be provided access to or through with the network.

A similar process can occur when carrier subscribers seek to migrate to private LTE networks. Private LTE networks can include businesses, industrial facilities, airports, or individual home users. UE 198 can attempt to reach and attach to access point 184 associated with private network 174. Private network 174, which may but need not include its own account databases, can signal authentication elements of network broker 110 over the Internet using, e.g., a private LTE gateway or through a gateway provided by network broker 110 or another service.

Once the signal is received by network broker 110 or elements thereof capable of performing authentication, a determination can be made regarding whether to authenticate UE 198. This can be based on, e.g., the presence of a valid profile in broker database 120. This can include information from a carrier account (or another private network account) to verify payment information, agreements, or other conditions to access. Provided a valid profile exists and any other conditions are satisfied (e.g., private network 174 is accepting additional connections, no quality of service requirements violated, not a banned user), access can be granted to UE 198.

The network broker accordingly facilitates the conditional use of shared spectrum frequencies, the establishment of private networks on shared spectrum frequencies, and roaming by devices registered to private networks and roaming by carrier devices on private networks.

While terms such as "broker," "spectrum management entity," and others are used in FIG. 1A and throughout this disclosure to describe a shared spectrum management entity within virtualized environments, other management entities (which can also manage non-virtual elements or entities) which are termed differently can also be employed herein without departing from the scope or spirit of the innovation. In particular embodiments, the broker exists as a third party element and can be independent of any particular carrier (public) networks, private networks, and/or other networks with which it interacts. More, brokers or management entities can be divided, distributed, or implemented in a variety of manners other than those illustrated. One or more protocols such as a proprietary network broker protocol, SS7 or SS7 over IP can be used for authentication. In embodiments, a federation of worldwide network brokers could be implemented which would interface to each other providing regional and global coverage.

Network broker 110 and other elements stay informed of shared frequency status (e.g., whether shared frequency use is allowed or disallowed based on incumbent activity) using shared access elements 140. Shared access element(s) 140 can be implemented in a variety of manners. As suggested, there may be more than one shared access element 140, and they may reside in various places throughout system 100 such that they are in communication with network broker 110. In embodiments shared access element 140 is a sensor that detects usage of one or more frequencies. In alternative or complementary embodiments, shared access element 140 can be an intermediary which receives information from another source of data providing information related to shared frequencies. In alternative or complementary embodiments, shared access element 140 is a source of data other than a sensor, such as a scheduling element or informative element from a regulatory authority or carrier possessing authority or knowledge to promulgate information regarding shared frequency availability or activity. In various embodiments, shared access element 140 may exist outside any of private networks 174, core networks 176 and 178, regional networks 180 and 182, and others, as well as shared access broker 110. In various embodiments, shared access element 140 may exist inside any of private networks 174, core networks 176 and 178, regional networks 180 and 182, and others, as well as shared access broker 110. In alternative or complementary embodiments, additional shared access elements 140 can exist in alternate locations inside or outside the aspects pictured in FIG. 1A, and may include one or more of an administrative element with authority to dictate shared frequency availability, a reporting element which reports information from authoritative sources, a sensor which senses activity on shared frequency usage or activity, and/or other variants which can provide shared access data which facilitates frequency allocation and other decisions. For example, shared availability or incumbent use of the 3.5 Ghz band can be ordered, reported, or detected by one or more shared access elements 140. In embodiments, multiple shared access elements 140 can function as failsafes to corroborate frequency reallocation or availability if some sources of shared access data fail to transmit timely information or if conflicting information is received.

FIG. 1B illustrates a more particularized view of network broker 110. Network broker 110 in one example includes shared access interface 112, shared access processing module 114, network communication interface 116, and additional elements (described herein) 118. Network broker 110 also includes or is communicatively coupled to broker database 120, which stores profiles of various shared access network elements to provide for management and conflict resolution for different elements as well as facilitating interoperability between various carrier and private networks. In at least one embodiment the network command controls an association of the shared access network elements with one or more networks (e.g., public/carrier LTE networks, private LTE networks, shared spectrum networks, dedicated spectrum networks).

Shared access interface 112 is configured to receive shared access system condition data from at least one shared access system element 140. In embodiments, various portions of shared access system data can be provided to inform systems and subsystems utilizing shared frequencies (e.g., at least APs 184, 186, and 188 and other network elements broadcasting or receiving on shared frequencies) of shared frequency availability (e.g., whether an incumbent/higher-tier priority user is utilizing the frequency) and take action in view of such utilization. Shared access system data can also inform systems and subsystems of other elements' usage, provide information to register elements (e.g., private elements not associated with a carrier network) to the broker facilitating shared access system interoperability, et cetera. In at least one embodiment, the shared access system element(s) 140 include a sensor configured to detect radio traffic over a shared radio frequency. Shared access system element 140, in embodiments, is configured to receive information from another shared access system element 140 at least in part by way of an application programming interface of a shared access system.

Shared access processing module 114 is configured to generate a network command by analyzing the shared access system condition data from shared access system element(s) 140. This analysis can include, e.g., determination of an owner or identity of a device, node, element, et cetera, subscription information, home and roaming network information, frequency usage capabilities, current frequency usage, requested frequency usage, past frequency usage, other device frequency usage, frequency usage priority, et cetera, to generate network commands capable of causing, e.g., device handoff between various networks, conflict resolution of frequency usage, enforcement of shared access criteria or conditions, et cetera. Such aspects can also include interpreting, applying rules to, discerning instructions from, converting, or otherwise transforming shared access system data to develop commands for any impacted system (e.g., a system broadcasting or receiving over a shared access frequency that must be relinquished due to higher priority use; UE or other elements seeking to associate with a private or public network utilizing shared frequencies).

Network commands can be directed to one or more nodes, elements, devices, et cetera, may be generated and transmitted for use by multiple elements or a specific target element, and/or may be generated in groups to target multiple elements simultaneously with different commands (such as for, e.g., an unscheduled frequency shift to support emergent incumbent frequency usage). In an embodiment, the network command is configured to allow or disallow use of a shared radio frequency by the network element based on the shared access system condition data. This can include, e.g., instructing various downstream controllers or other network elements to propagate a frequency change to access points or other nodes. In another embodiment, the network command can instruct a non-home network to grant or deny access to a device seeking to associate with the non-home network.

Network communication interface 116 is configured to provide the network command to one or more network elements among shared access network elements. Network commands can be provided through, e.g., APIs, gateways, proprietary channels, and other communication interfaces. In at least one embodiment, the network command can be published at a location referenced by one or more network elements for discovery.

In further embodiments, network communication interface 116 can be configured to receive a request from the network element. Shared access processing module 114 can be configured generate a response command based on the request. In at least one embodiment, the request includes a request to register a private network configured to operate on a shared frequency in the network broker database. In at least one embodiment, the request includes a request to hand off the network element between a private network and a public network.

Network broker database 120 is configured to store network element profiles for the shared access network elements. The network broker database can include, e.g., identification of user equipment or network elements, payment information, historical details, local or international identifiers, temporary or permanent identifiers, and other information which can be used in authentication, authorization, and accounting across multiple networks. Network broker database 120 provides subscriber or user databases independent of carrier networks which link user equipment or network elements to account information and/or respective home networks to facilitate interaction and interoperability in a shared spectrum connectivity environment including public and private networks.

Multi-broker embodiments are possible in various embodiments. In at least one embodiment, network communication interface 116 is configured to communicate with another network broker 110. In this regard, a regional or global arrangement of brokers covering a variety of disparate data sources (e.g., shared access systems operated by different entities or different carriers having varying subscriber information) can maximize shared frequency condition awareness and device or node interoperability regardless of home network or account information. Alternatively or complementarily, network broker 110 can communicate with various hypervisors or administrators (e.g., at core or regional carrier networks, in private networks, et cetera) to send and receive proper information and control related elements in various networks.

Various additional modules 118 can be included in embodiments. In an embodiment, a security module of the network broker is provided. The security module enforces security protocols against traffic from at least the shared access system element 140.

In an embodiment, network broker 110 includes a shared access roaming agent configured to locate at least one network having an internet gateway. In this fashion, roaming users can discern between networks being used for proprietary uses and/or local traffic, and networks configured to provide access to the Internet (or desired portions of networks). In at least one embodiment, the shared access roaming agent is not a module of network broker 110 but a separate element of system 100 configured to communicate with user equipment, various network elements, and/or network communication interface 116.

In further embodiments, additional modules 118 can include an impact module of network broker 110. The impact module can be configured to determine one or more network elements impacted by the shared access system data or other information received. In embodiments, the impact module can also determine impact to other modules, such as downstream or dependent modules, based on the shared access system data. Such impacts can include, e.g., loss of a frequency based on higher-priority use which is reported or detected. This can be used, along with information from broker database 120, to ensure network commands or other information are provided to appropriate nodes.

In embodiments, network broker 110 is a virtualized instance of a broker. Further, network elements with which network broker 110 interacts can be virtualized instances of network elements. In this regard, they can be created, configured, or destroyed in a number of discrete or distributed locations on-demand based on conditions or configuration. In embodiments, shared access processing module 114 creates and destroys the virtualized instance of a network element based at least in part on the shared access system data. Creation or destruction of brokers can be performed by a master broker and/or administrator based on the conditions throughout various networks with which any of the brokers interacts.

Figure 2A:
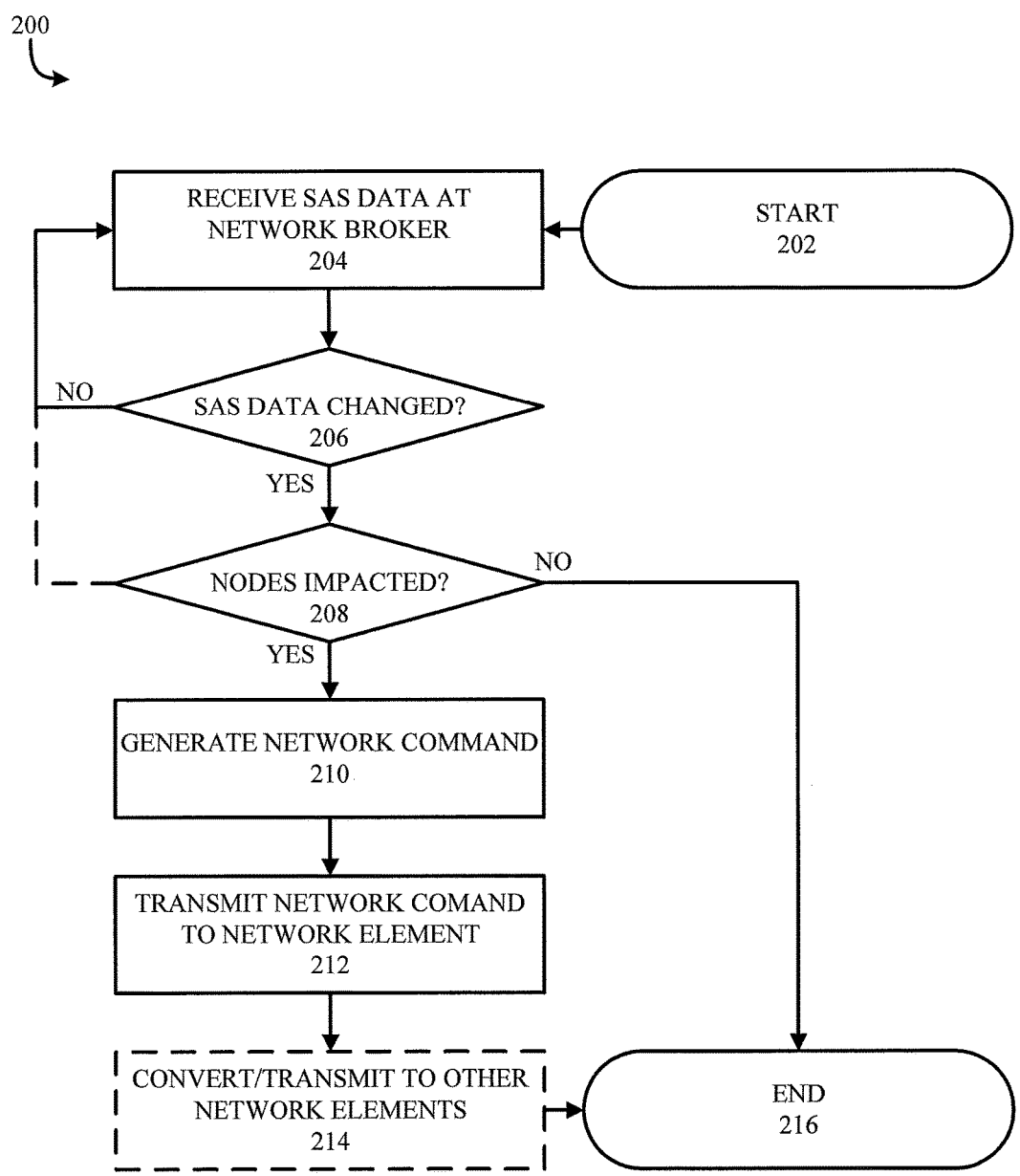
FIG. 2A illustrates a block diagram of an example methodology utilizing a spectrum management entity disclosed herein.

Additional, alternative, and/or complementary techniques are described in reference to methodologies disclosed herein. In this regard, FIG. 2A illustrates a block diagram of an example methodology 200 for managing various shared network elements with network broker 110 using shared access system data. Methodology 200 begins at 202 and proceeds to 204 where shared access system data is received at a network broker 110. By leveraging network broker 110, various network elements can be protected from shared access system elements 140 to accord with security best practices shielding sensitive elements and network architecture from extensive observation by other carrier networks. Further, network broker 110 can communicate with various network entities to coordinate their behavior in shared frequency environments without those entities necessarily requiring access to a shared access system.

At 206 a determination can be made as to whether the shared access system data has changed. Changes can include, e.g., current or projected use of shared spectrum frequencies (e.g., when one or more frequencies in a shared spectrum will be unavailable, available, or subject to particular conditions such as heavy traffic), current or projected availability of shared spectrum frequencies (e.g., incidental or scheduled incumbent use or non-use of a shared frequency), and others. In various embodiments, shared access system data other than frequency management can be promulgated, such as the initialization or shutdown of a private network, the presence or absence of devices such as UEs 192, 194, 196, and 198 on or transitioning between various networks such as private networks 174 or core networks 176 and 178, and so forth. In at least one embodiment, shared access system data can be received, monitored, and analyzed regardless of whether any network element is actively using a shared frequency.

If the shared access system has not changed as indicated by the determination at 206 returning negative, methodology 200 can recycle to 204 where additional shared access system data is received or awaited to manage shared access system frequencies throughout core or regional networks.

If the determination at 206 returns positive, methodology 200 proceeds to 208 where a determination is made as to whether any network elements in communication with the network broker are impacted by the change. Such elements can include various user equipment 192, 194, 196, and 198, access points 184, 186, and 188, or various elements of private network 174, regional networks 180 and 182, and/or core networks 176 and 178. Such changes can include changes to use or non-use of shared frequencies, authentication and access changes across networks, or other updates. If the determination at 208 returns negative, methodology 200 may proceed to end at 216, or alternatively recycle to 204 where additional shared access system data is received or awaited to manage shared access system frequencies throughout networks.

If the determination at 208 returns positive, a network command is generated at 210. The network command can at least provide a command for network elements impacted by the change to shared access system data. In embodiments, changes to the core or regional network elements (e.g., APs 186 and 188, a gateway, or other aspects of core and regional carrier networks) themselves are effectuated by the network command. The network command could also, in an example, effectuate changes to network elements outside carrier networks or in non-carrier networks. In alternative or complementary embodiments, elements downstream of a network element (e.g., edge nodes such as APs 184, 186, and 188) are changed based on the shared access system data, but the network command routes this information to upstream public or private network elements to be passed along (and, in embodiments, modified as the data proceeds downstream to edge nodes or other elements).

At 212, the network command generated at 210 is transmitted to the network element(s). Thereafter, at 214, in embodiments the network command may be converted and/or transmitted to other network elements in the event they are impacted or communicatively coupled with elements impacted by the changed shared access system data. At 216, methodology 200 ends, or may recycle to 204 to receive or await further shared access system data.

Figure 2B:
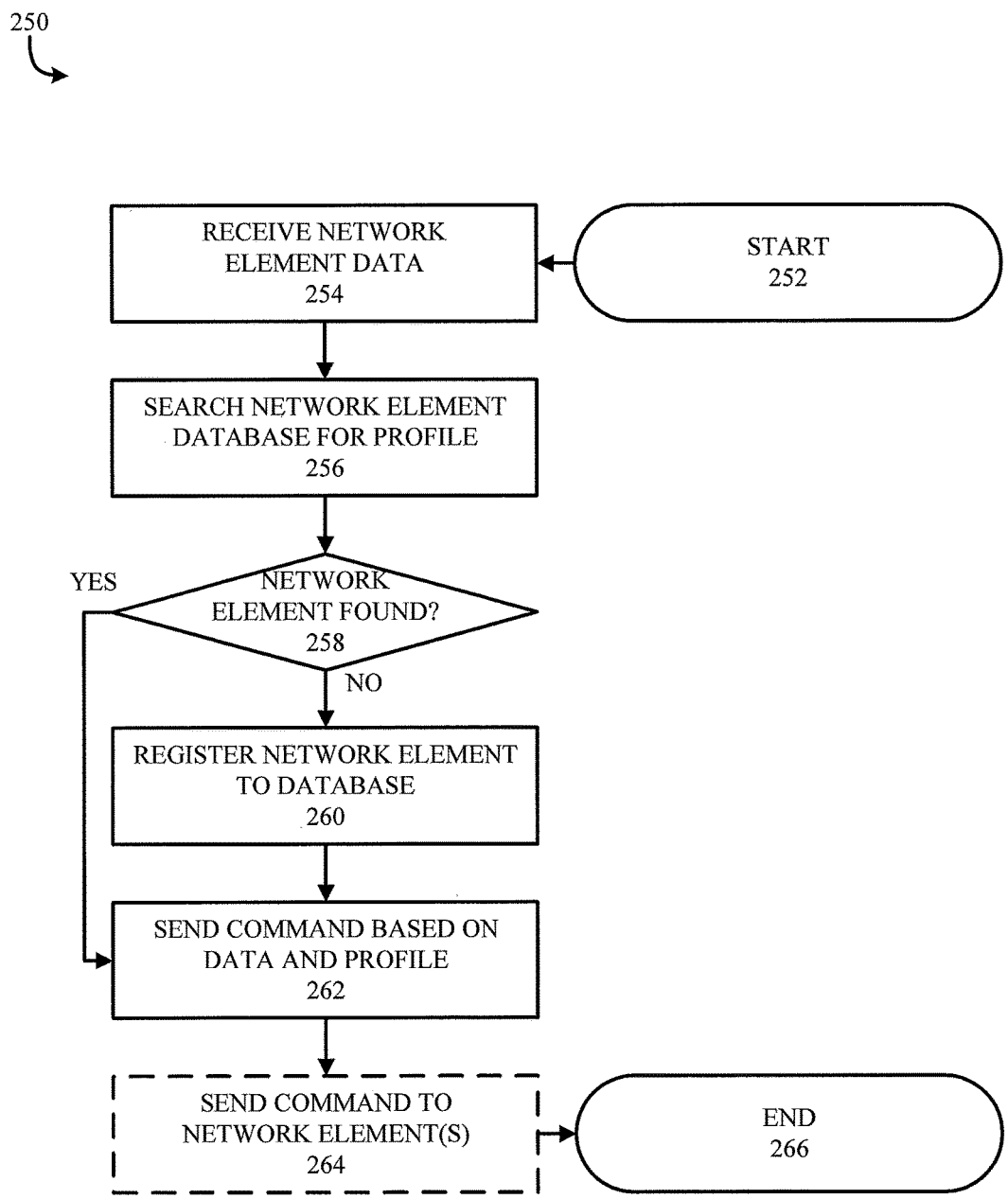
FIG. 2B illustrates a block diagram of another example methodology utilizing a spectrum management entity disclosed herein.

FIG. 2B illustrates another flow chart of an example methodology 250 applicable to frequency sharing techniques. Methodology 250 begins at 252 and proceeds to 254 where network element data is received. This can include a request from a network element or an update on status, activity, or performance of the network element.

Thereafter, at 256, broker database 120 is searched for information on the network element. The broker database 120 can be a database, registry, log, or table of entities and/or devices operating using one or more shared frequencies. In this way, the entities and/or devices can be tracked across and independent of carrier networks.

At 258 a determination is made as to whether the network element already exists in broker database 120, and/or if the network element is properly represented therein. If the determination returns negative, methodology 250 proceeds to 260 where the network element is registered to broker database 120 (or broker database 120 is updated according to current network element details). If the determination at 258 returns positive, or after broker database 120 is updated at 260, methodology 250 proceeds to 262.

At 262, action is taken in response to the received network element data. This can include responding to a request or query, updating information, or other action. In an embodiment, the network element is authenticated to another network (e.g., non-home carrier network, private network) at 262.

At 264, additional commands can be sent to network elements in particular embodiments. These can include follow-on activity or reporting relating to the action at 262, de-confliction of shared frequencies in response to action at 162, and others. Thereafter, at 266, methodology 250 ends.

Methodologies 200 and 250 are illustrated for ease of understanding, but should not be deemed limiting. Additional aspects can be included, or aspects excluded, without departing from the scope or spirit of the innovation. Various other methodologies can be implemented according to the disclosures herein. Further, one or more aspects of these methodologies can be combined, or modified with other aspects herein.

Another example method can comprise receiving a shared access request from a network element among shared access network elements, searching a network broker database for a network element profile associated with the network element, generating a network command based on the shared access request and the network element profile, and transmitting the network command.

In a further embodiment, such methods can comprise receiving shared access system condition data from a shared access system element at a network broker. The network command can be further based on analysis of the shared access system condition data.

In a further embodiment, such methods can comprise modifying the network element profile in the network broker database based on the shared access system condition data. In particular embodiments, the network command is configured to allow or disallow use of a shared radio frequency by the network element based on the shared access system condition data.

In various embodiments, the network broker database is outside home networks of the shared access network elements. In various embodiments, the shared access request includes a request to hand off the network element between a private network and a public network. In still further alternative or complementary embodiments, methods can further comprise authenticating the network element to a network.

FIGS. 3-10 show a variety of aspects used in conjunction with or providing context for the broker and other elements. Particularly, FIG. 3 describes virtualization in the context of instances described above, and FIGS. 4-10 show various computing and network environments with which aspects herein are compatible.

Figure 3:
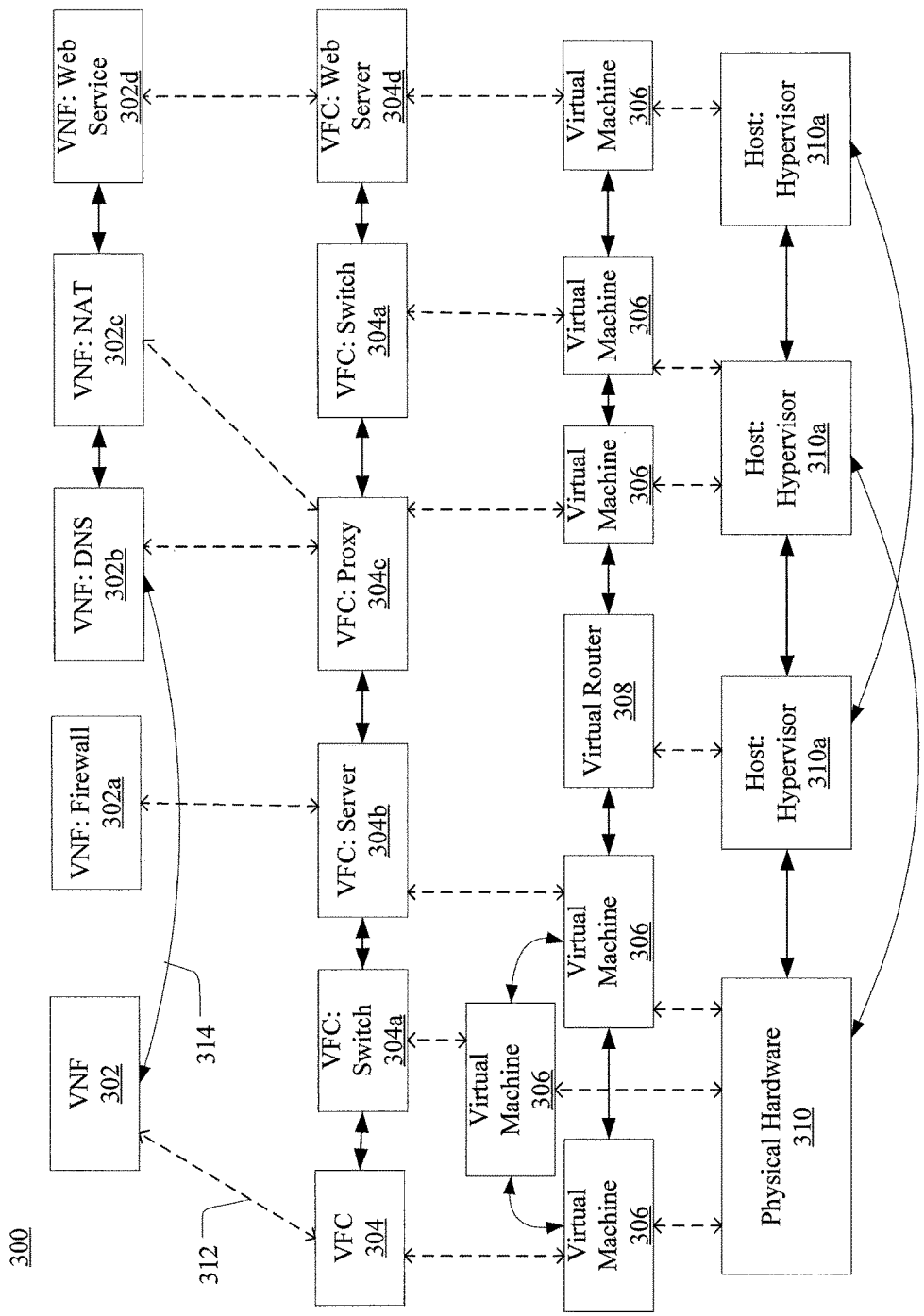
FIG. 3 is a representation of an example network.

FIG. 3 is a representation of an example network 300. Network 300 may comprise an SDN—that is, network 300 may include one or more virtualized functions implemented on general purpose hardware, such as in lieu of having dedicated hardware for every network function. That is, general purpose hardware of network 300 may be configured to run virtual network elements to support communication services, such as mobility services, including consumer services and enterprise services. These services may be provided or measured in sessions.

A virtual network functions (VNFs) 302 may be able to support a limited number of sessions. Each VNF 302 may have a VNF type that indicates its functionality or role. For example, FIG. 3 illustrates a gateway VNF 302a and a policy and charging rules function (PCRF) VNF 302b.

Additionally or alternatively, VNFs 302 may include other types of VNFs. Each VNF 302 may use one or more virtual machines (VMs) 304 to operate. Each virtual machine (VM) 304 may have a VM type that indicates its functionality or role. For example, FIG. 3 illustrates a MCM VM 304a, an ASM VM 304b, and a DEP VM 304c. Additionally or alternatively, VMs 304 may include other types of VMs. Each VM 304 may consume various network resources from a hardware platform 306, such as a resource 308, a virtual central processing unit (vCPU) 308a, memory 308b, or a network interface card (MC) 308c. Additionally or alternatively, hardware platform 306 may include other types of resources 308.

While FIG. 3 illustrates resources 308 as collectively contained in hardware platform 306, the configuration of hardware platform 306 may isolate, for example, certain memory 308c from other memory 108c.

Hardware platform 306 may comprise one or more chasses 310. Chassis 310 may refer to the physical housing or platform for multiple servers or other network equipment. In an aspect, chassis 310 may also refer to the underlying network equipment. Chassis 310 may include one or more servers 312. Server 312 may comprise general purpose computer hardware or a computer. In an aspect, chassis 310 may comprise a metal rack, and servers 312 of chassis 310 may comprise blade servers that are physically mounted in or on chassis 310.

Each server 312 may include one or more network resources 308, as illustrated. Servers 312 may be communicatively coupled together (not shown) in any combination or arrangement. For example, all servers 312 within a given chassis 310 may be communicatively coupled. As another example, servers 312 in different chasses 310 may be communicatively coupled. Additionally or alternatively, chasses 310 may be communicatively coupled together (not shown) in any combination or arrangement.

The characteristics of each chassis 310 and each server 312 may differ. The type or number of resources 310 within each server 312 may vary. In an aspect, chassis 310 may be used to group servers 312 with the same resource characteristics. In another aspect, servers 312 within the same chassis 310 may have different resource characteristics.

Given hardware platform 306, the number of sessions that may be instantiated may vary depending upon how efficiently resources 308 are assigned to different VMs 304. For example, assignment of VMs 304 to particular resources 308 may be constrained by one or more rules. For example, a first rule may require that resources 308 assigned to a particular VM 304 be on the same server 312 or set of servers 312. For example, if VM 304 uses eight vCPUs 308a, 1 GB of memory 308b, and 2 NICs 308c, the rules may require that all of these resources 308 be sourced from the same server 312. Additionally or alternatively, VM 304 may require splitting resources 308 among multiple servers 312, but such splitting may need to conform with certain restrictions. For example, resources 308 for VM 304 may be able to be split between two servers 312. Default rules may apply. For example, a default rule may require that all resources 308 for a given VM 304 must come from the same server 312.

An affinity rule may restrict assignment of resources 308 for a particular VM 304 (or a particular type of VM 304). For example, an affinity rule may require that certain VMs 304 be instantiated on (that is, consume resources from) the same server 312 or chassis 310. For example, if VNF 302 uses six MCM VMs 304a, an affinity rule may dictate that those six MCM VMs 304a be instantiated on the same server 312 (or chassis 310). As another example, if VNF 302 uses MCM VMs 304a, ASM VMs 304b, and a third type of VMs 304, an affinity rule may dictate that at least the MCM VMs 304a and the ASM VMs 304b be instantiated on the same server 312 (or chassis 310). Affinity rules may restrict assignment of resources 308 based on the identity or type of resource 308, VNF 302, VM 304, chassis 310, server 312, or any combination thereof.

An anti-affinity rule may restrict assignment of resources 308 for a particular VM 304 (or a particular type of VM 304). In contrast to an affinity rule—which may require that certain VMs 304 be instantiated on the same server 312 or chassis 310—an anti-affinity rule requires that certain VMs 304 be instantiated on different servers 312 (or different chasses 310). For example, an anti-affinity rule may require that MCM VM 304a be instantiated on a particular server 312 that does not contain any ASM VMs 304b. As another example, an anti-affinity rule may require that MCM VMs 304a for a first VNF 302 be instantiated on a different server 312 (or chassis 310) than MCM VMs 304a for a second VNF 302. Anti-affinity rules may restrict assignment of resources 308 based on the identity or type of resource 308, VNF 302, VM 304, chassis 310, server 312, or any combination thereof.

Within these constraints, resources 308 of hardware platform 306 may be assigned to be used to instantiate VMs 304, which in turn may be used to instantiate VNFs 302, which in turn may be used to establish sessions. The different combinations for how such resources 308 may be assigned may vary in complexity and efficiency. For example, different assignments may have different limits of the number of sessions that can be established given a particular hardware platform 306.

For example, consider a session that may require gateway VNF 302a and PCRF VNF 302b. Gateway VNF 302a may require five VMs 304 instantiated on the same server 312, and PCRF VNF 302b may require two VMs 304 instantiated on the same server 312. (Assume, for this example, that no affinity or anti-affinity rules restrict whether VMs 304 for PCRF VNF 302b may or must be instantiated on the same or different server 312 than VMs 304 for gateway VNF 302a.) In this example, each of two servers 312 may have sufficient resources 308 to support 10 VMs 304. To implement sessions using these two servers 312, first server 312 may be instantiated with 10 VMs 304 to support two instantiations of gateway VNF 302a, and second server 312 may be instantiated with 9 VMs: five VMs 304 to support one instantiation of gateway VNF 302a and four VMs 304 to support two instantiations of PCRF VNF 302b. This may leave the remaining resources 308 that could have supported the tenth VM 304 on second server 312 unused (and unusable for an instantiation of either a gateway VNF 302a or a PCRF VNF 302b). Alternatively, first server 312 may be instantiated with 10 VMs 304 for two instantiations of gateway VNF 302a and second server 312 may be instantiated with 10 VMs 304 for five instantiations of PCRF VNF 302b, using all available resources 308 to maximize the number of VMs 304 instantiated.

Consider, further, how many sessions each gateway VNF 302a and each PCRF VNF 302b may support. This may factor into which assignment of resources 308 is more efficient. For example, consider if each gateway VNF 302a supports two million sessions, and if each PCRF VNF 302b supports three million sessions. For the first configuration three total gateway VNFs 302a (which satisfy the gateway requirement for six million sessions) and two total PCRF VNFs 302b (which satisfy the PCRF requirement for six million sessions)—would support a total of six million sessions. For the second configuration—two total gateway VNFs 302a (which satisfy the gateway requirement for four million sessions) and five total PCRF VNFs 302b (which satisfy the PCRF requirement for 15 million sessions)—would support a total of four million sessions. Thus, while the first configuration may seem less efficient looking only at the number of available resources 308 used (as resources 308 for the tenth possible VM 304 are unused), the second configuration is actually more efficient from the perspective of being the configuration that can support more the greater number of sessions.

To solve the problem of determining a capacity (or, number of sessions) that can be supported by a given hardware platform 305, a given requirement for VNFs 302 to support a session, a capacity for the number of sessions each VNF 302 (e.g., of a certain type) can support, a given requirement for VMs 304 for each VNF 302 (e.g., of a certain type), a give requirement for resources 308 to support each VM 304 (e.g., of a certain type), rules dictating the assignment of resources 308 to one or more VMs 304 (e.g., affinity and anti-affinity rules), the chasses 310 and servers 312 of hardware platform 306, and the individual resources 308 of each chassis 310 or server 312 (e.g., of a certain type), an integer programming problem may be formulated. In the aspects below, a variety of example modules for operating a virtual environment are described. These example modules may include a management control function (MCM), an advanced services module (ASM), an input/output module (IOM), a workflow services module (WSM), a centralized control module (CCM), a distributed control module (DCM), and others.

First, a plurality of index sets may be established. For example, index set L may include the set of chasses 310. For example, if a system allows up to 6 chasses 310, this set may be:
L={1, 2, 3, 4, 5, 6},
where l is an element of L.

Another index set J may include the set of servers 312. For example, if a system allows up to 16 servers 312 per chassis 310, this set may be:
J={1, 2, 3, . . . , 16},
where j is an element of J.

As another example, index set K having at least one element k may include the set of VNFs 302 that may be considered. For example, this index set may include all types of VNFs 302 that may be used to instantiate a service. For example, let
K={GW, PCRF}
where GW represents gateway VNFs 302a and PCRF represents PCRF VNFs 302b.

Another index set I(k) may equal the set of VMs 304 for a VNF 302k. Thus, let
I(GW)={MCM, ASM, IOM, WSM, CCM, DCM}
represent VMs 304 for gateway VNF 302a, where MCM represents MCM VM 304a, ASM represents ASM VM 304b, and each of IOM, WSM, CCM, and DCM represents a respective type of VM 304. Further, let
I(PCRF)={DEP, DIR, POL, SES, MAN}
represent VMs 304 for PCRF VNF 302b, where DEP represents DEP VM 304c and each of DIR, POL, SES, and MAN represent a respective type of VM 304.

Another index set V may include the set of possible instances of a given VM 304. For example, if a system allows up to 20 instances of VMs 302, this set may be:
V={1, 2, 3, . . . , 20},
where v is an element of V.

In addition to the sets, the integer programming problem may include additional data. The characteristics of VNFs 302, VMs 304, chasses 310, or servers 312 may be factored into the problem. This data may be referred to as parameters. For example, for given VNF 302k, the number of sessions that VNF 302k can support may be defined as a function S(k). In an aspect, for an element k of set K, this parameter may be represented by
$S(k) >= 0$;
is a measurement of the number of sessions k can support. Returning to the earlier example where gateway VNF 302a may support 2 million sessions, then this parameter may be S(GW)=2,000,000.

VM 304 modularity may be another parameter in the integer programming problem. VM 304 modularity may represent the VM 304 requirement for a type of VNF 302. For example, for k that is an element of set K and i that is an element of set I, each instance of VNF k may require M(k, i) instances of VMs 304. For example, recall the example where I(GW={MCM, ASM, IOM, WSM, CCM, DCM}.
In an example, M(GW, I(GW)) may be the set that indicates the number of each type of VM 304 that may be required to instantiate gateway VNF 302a. For example,
M(GW, I(GW))={2, 16, 4, 4, 2, 4}
may indicate that one instantiation of gateway VNF 302a may require two instantiations of MCM VMs 304a, 16 instantiations of VM 304b, four instantiations of TOM VM 304, four instantiations of WSM VM 304, two instantiations of CCM VM 304, and four instantiations of DCM VM 304.

Another parameter may indicate the capacity of hardware platform 306. For example, a parameter C may indicate the number of vCPUs 308a required for each VM 304 type i and for each VNF 302 type k. For example, this may include the parameter
C(k, i).
For example, if MCM VM 304a for gateway VNF 302a requires 20 vCPUs 308a, this may be represented as
C(GW, MCM)=20.

However, given the complexity of the integer programming problem—the numerous variables and restrictions that must be satisfied—implementing an algorithm that may be used to solve the integer programming problem efficiently, without sacrificing optimality, may be difficult.

Figure 4:
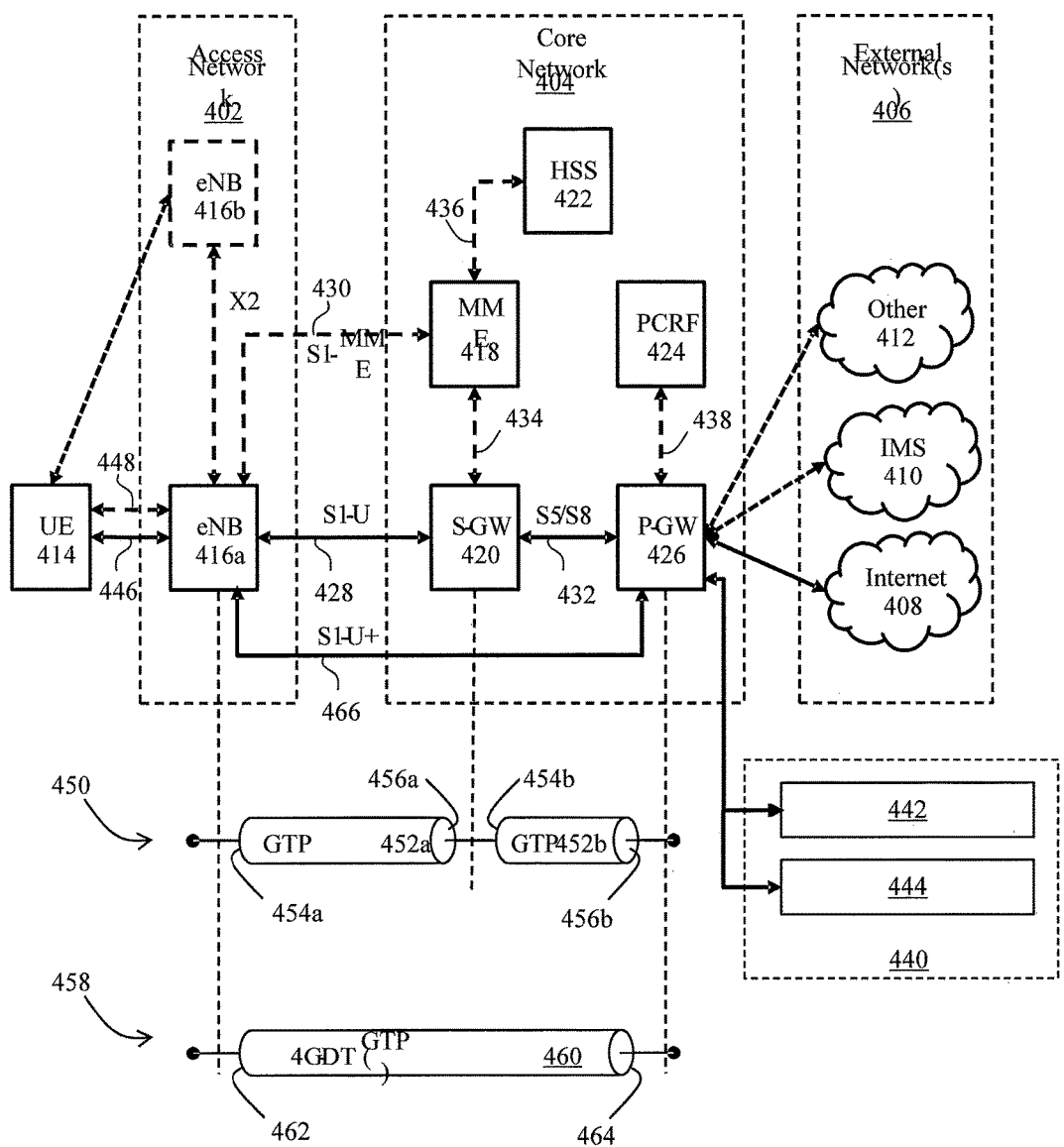
FIG. 4 depicts an example communication system that provides wireless telecommunication services over wireless communication networks.

FIG. 4 illustrates a functional block diagram depicting one example of an LTE-EPS network architecture 400 that may be at least partially implemented as an SDN. Network architecture 400 disclosed herein is referred to as a modified LTE-EPS architecture 400 to distinguish it from a traditional LTE-EPS architecture.

An example modified LTE-EPS architecture 400 is based at least in part on standards developed by the 3rd Generation Partnership Project (3GPP), with information available at www.3gpp.org. LTE-EPS network architecture 400 may include an access network 402, a core network 404, e.g., an EPC or Common BackBone (CBB) and one or more external networks 406, sometimes referred to as PDN or peer entities. Different external networks 406 can be distinguished from each other by a respective network identifier, e.g., a label according to DNS naming conventions describing an access point to the PDN. Such labels can be referred to as Access Point Names (APN). External networks 406 can include one or more trusted and non-trusted external networks such as an internet protocol (IP) network 408, an IP multimedia subsystem (IMS) network 410, and other networks 412, such as a service network, a corporate network, or the like. In an aspect, access network 402, core network 404, or external network 405 may include or communicate with a network.

Access network 402 can include an LTE network architecture sometimes referred to as Evolved Universal mobile Telecommunication system Terrestrial Radio Access (E UTRA) and evolved UMTS Terrestrial Radio Access Network (E-UTRAN). Broadly, access network 402 can include one or more communication devices, commonly referred to as UE 414, and one or more wireless access nodes, or base stations 416a, 416b. During network operations, at least one base station 416 communicates directly with UE 414. Base station 416 can be an evolved Node B (e-NodeB), with which UE 414 communicates over the air and wirelessly. UEs 414 can include, without limitation, wireless devices, e.g., satellite communication systems, portable digital assistants (PDAs), laptop computers, tablet devices and other mobile devices (e.g., cellular telephones, smart appliances, and so on). UEs 414 can connect to eNBs 416 when UE 414 is within range according to a corresponding wireless communication technology.

UE 414 generally runs one or more applications that engage in a transfer of packets between UE 414 and one or more external networks 406. Such packet transfers can include one of downlink packet transfers from external network 406 to UE 414, uplink packet transfers from UE 414 to external network 406 or combinations of uplink and downlink packet transfers. Applications can include, without limitation, web browsing, VoIP, streaming media and the like. Each application can pose different Quality of Service (QoS) requirements on a respective packet transfer. Different packet transfers can be served by different bearers within core network 404, e.g., according to parameters, such as the QoS.

Core network 404 uses a concept of bearers, e.g., EPS bearers, to route packets, e.g., IP traffic, between a particular gateway in core network 404 and UE 414. A bearer refers generally to an IP packet flow with a defined QoS between the particular gateway and UE 414. Access network 402, e.g., E UTRAN, and core network 404 together set up and release bearers as required by the various applications. Bearers can be classified in at least two different categories: (i) minimum guaranteed bit rate bearers, e.g., for applications, such as VoIP; and (ii) non-guaranteed bit rate bearers that do not require guarantee bit rate, e.g., for applications, such as web browsing.

In one embodiment, the core network 404 includes various network entities, such as MME 418, SGW 420, Home Subscriber Server (HSS) 422, Policy and Charging Rules Function (PCRF) 424 and packet data network (PDN) gateway (PGW) 426. In one embodiment, MME 418 comprises a control node performing a control signaling between various equipment and devices in access network 402 and core network 404. The protocols running between UE 414 and core network 404 are generally known as Non-Access Stratum (NAS) protocols.

For illustration purposes only, the terms MME 418, SGW 420, HSS 422 and PGW 426, and so on, can be server devices, but may be referred to in the subject disclosure without the word "server." It is also understood that any form of such servers can operate in a device, system, component, or other form of centralized or distributed hardware and software. It is further noted that these terms and other terms such as bearer paths and/or interfaces are terms that can include features, methodologies, and/or fields that may be described in whole or in part by standards bodies such as the 3GPP. It is further noted that some or all embodiments of the subject disclosure may in whole or in part modify, supplement, or otherwise supersede final or proposed standards published and promulgated by 3GPP.

According to traditional implementations of LTE-EPS architectures, SGW 420 routes and forwards all user data packets. SGW 420 also acts as a mobility anchor for user plane operation during handovers between base stations, e.g., during a handover from first eNB 416a to second eNB 416b as may be the result of UE 414 moving from one area of coverage, e.g., cell, to another. SGW 420 can also terminate a downlink data path, e.g., from external network 406 to UE 414 in an idle state, and trigger a paging operation when downlink data arrives for UE 414. SGW 420 can also be configured to manage and store a context for UE 414, e.g., including one or more of parameters of the IP bearer service and network internal routing information. In addition, SGW 420 can perform administrative functions, e.g., in a visited network, such as collecting information for charging (e.g., the volume of data sent to or received from the user), and/or replicate user traffic, e.g., to support a lawful interception. SGW 420 also serves as the mobility anchor for interworking with other 3GPP technologies such as universal mobile telecommunication system (UMTS).

At any given time, UE 414 is generally in one of three different states: detached, idle, or active. The detached state is typically a transitory state in which UE 414 is powered on but is engaged in a process of searching and registering with network 402. In the active state, UE 414 is registered with access network 402 and has established a wireless connection, e.g., radio resource control (RRC) connection, with eNB 416. Whether UE 414 is in an active state can depend on the state of a packet data session, and whether there is an active packet data session. In the idle state, UE 414 is generally in a power conservation state in which UE 414 typically does not communicate packets. When UE 414 is idle, SGW 420 can terminate a downlink data path, e.g., from one peer entity 406, and triggers paging of UE 414 when data arrives for UE 414. If UE 414 responds to the page, SGW 420 can forward the IP packet to eNB 416a.

HSS 422 can manage subscription-related information for a user of UE 414. For example, tHSS 422 can store information such as authorization of the user, security requirements for the user, quality of service (QoS) requirements for the user, etc. HSS 422 can also hold information about external networks 406 to which the user can connect, e.g., in the form of an APN of external networks 406. For example, MME 418 can communicate with HSS 422 to determine if UE 414 is authorized to establish a call, e.g., a voice over IP (VoIP) call before the call is established.

PCRF 424 can perform QoS management functions and policy control. PCRF 424 is responsible for policy control decision-making, as well as for controlling the flow-based charging functionalities in a policy control enforcement function (PCEF), which resides in PGW 426. PCRF 424 provides the QoS authorization, e.g., QoS class identifier and bit rates that decide how a certain data flow will be treated in the PCEF and ensures that this is in accordance with the user's subscription profile.

PGW 426 can provide connectivity between the UE 414 and one or more of the external networks 406. In illustrative network architecture 400, PGW 426 can be responsible for IP address allocation for UE 414, as well as one or more of QoS enforcement and flow-based charging, e.g., according to rules from the PCRF 424. PGW 426 is also typically responsible for filtering downlink user IP packets into the different QoS-based bearers. In at least some embodiments, such filtering can be performed based on traffic flow templates. PGW 426 can also perform QoS enforcement, e.g., for guaranteed bit rate bearers. PGW 426 also serves as a mobility anchor for interworking with non-3GPP technologies such as CDMA2000.

Within access network 402 and core network 404 there may be various bearer paths/interfaces, e.g., represented by solid lines 428 and 430. Some of the bearer paths can be referred to by a specific label. For example, solid line 428 can be considered an S1-U bearer and solid line 432 can be considered an S5/S8 bearer according to LTE-EPS architecture standards. Without limitation, reference to various interfaces, such as S1, X2, S5, S8, S11 refer to EPS interfaces. In some instances, such interface designations are combined with a suffix, e.g., a "U" or a "C" to signify whether the interface relates to a "User plane" or a "Control plane." In addition, the core network 404 can include various signaling bearer paths/interfaces, e.g., control plane paths/interfaces represented by dashed lines 430, 434, 436, and 438. Some of the signaling bearer paths may be referred to by a specific label. For example, dashed line 430 can be considered as an S1-MME signaling bearer, dashed line 434 can be considered as an S11 signaling bearer and dashed line 436 can be considered as an S6a signaling bearer, e.g., according to LTE-EPS architecture standards. The above bearer paths and signaling bearer paths are only illustrated as examples and it should be noted that additional bearer paths and signaling bearer paths may exist that are not illustrated.

Also shown is a novel user plane path/interface, referred to as the S1-U+ interface 466. In the illustrative example, the S1-U+ user plane interface extends between the eNB 416a and PGW 426. Notably, S1-U+ path/interface does not include SGW 420, a node that is otherwise instrumental in configuring and/or managing packet forwarding between eNB 416a and one or more external networks 406 by way of PGW 426. As disclosed herein, the S1-U+ path/interface facilitates autonomous learning of peer transport layer addresses by one or more of the network nodes to facilitate a self-configuring of the packet forwarding path. In particular, such self-configuring can be accomplished during handovers in most scenarios so as to reduce any extra signaling load on the S/PGWs 420, 426 due to excessive handover events.

In some embodiments, PGW 426 is coupled to storage device 440, shown in phantom. Storage device 440 can be integral to one of the network nodes, such as PGW 426, for example, in the form of internal memory and/or disk drive. It is understood that storage device 440 can include registers suitable for storing address values. Alternatively or in addition, storage device 440 can be separate from PGW 426, for example, as an external hard drive, a flash drive, and/or network storage.

Storage device 440 selectively stores one or more values relevant to the forwarding of packet data. For example, storage device 440 can store identities and/or addresses of network entities, such as any of network nodes 418, 420, 422, 424, and 426, eNBs 416 and/or UE 414. In the illustrative example, storage device 440 includes a first storage location 442 and a second storage location 444. First storage location 442 can be dedicated to storing a Currently Used Downlink address value 442. Likewise, second storage location 444 can be dedicated to storing a Default Downlink Forwarding address value 444. PGW 426 can read and/or write values into either of storage locations 442, 444, for example, managing Currently Used Downlink Forwarding address value 442 and Default Downlink Forwarding address value 444 as disclosed herein.

In some embodiments, the Default Downlink Forwarding address for each EPS bearer is the SGW S5-U address for each EPS Bearer. The Currently Used Downlink Forwarding address" for each EPS bearer in PGW 426 can be set every time when PGW 426 receives an uplink packet, e.g., a GTP-U uplink packet, with a new source address for a corresponding EPS bearer. When UE 414 is in an idle state, the "Current Used Downlink Forwarding address" field for each EPS bearer of UE 414 can be set to a "null" or other suitable value.

In some embodiments, the Default Downlink Forwarding address is only updated when PGW 426 receives a new SGW S5-U address in a predetermined message or messages. For example, the Default Downlink Forwarding address is only updated when PGW 426 receives one of a Create Session Request, Modify Bearer Request and Create Bearer Response messages from SGW 420.

As values 442, 444 can be maintained and otherwise manipulated on a per bearer basis, it is understood that the storage locations can take the form of tables, spreadsheets, lists, and/or other data structures generally well understood and suitable for maintaining and/or otherwise manipulate forwarding addresses on a per bearer basis.

It should be noted that access network 402 and core network 404 are illustrated in a simplified block diagram in FIG. 4. In other words, either or both of access network 402 and the core network 404 can include additional network elements that are not shown, such as various routers, switches and controllers. In addition, although FIG. 4 illustrates only a single one of each of the various network elements, it should be noted that access network 402 and core network 404 can include any number of the various network elements. For example, core network 404 can include a pool (i.e., more than one) of MMEs 418, SGWs 420 or PGWs 426.

In the illustrative example, data traversing a network path between UE 414, eNB 416a, SGW 420, PGW 426 and external network 406 may be considered to constitute data transferred according to an end-to-end IP service. However, for the present disclosure, to properly perform establishment management in LTE-EPS network architecture 400, the core network, data bearer portion of the end-to-end IP service is analyzed.

An establishment may be defined herein as a connection set up request between any two elements within LTE-EPS network architecture 400. The connection set up request may be for user data or for signaling. A failed establishment may be defined as a connection set up request that was unsuccessful. A successful establishment may be defined as a connection set up request that was successful.

In one embodiment, a data bearer portion comprises a first portion (e.g., a data radio bearer 446) between UE 414 and eNB 416a, a second portion (e.g., an S1 data bearer 428) between eNB 416a and SGW 420, and a third portion (e.g., an S5/S8 bearer 432) between SGW 420 and PGW 426. Various signaling bearer portions are also illustrated in FIG. 4. For example, a first signaling portion (e.g., a signaling radio bearer 448) between UE 414 and eNB 416a, and a second signaling portion (e.g., S1 signaling bearer 430) between eNB 416a and MME 418.

In at least some embodiments, the data bearer can include tunneling, e.g., IP tunneling, by which data packets can be forwarded in an encapsulated manner, between tunnel endpoints. Tunnels, or tunnel connections can be identified in one or more nodes of a network, e.g.; by one or more of tunnel endpoint identifiers, an IP address and a user datagram protocol port number. Within a particular tunnel connection, payloads, e.g., packet data, which may or may not include protocol related information, are forwarded between tunnel endpoints.

An example of first tunnel solution 450 includes a first tunnel 452a between two tunnel endpoints 454a and 456a, and a second tunnel 452b between two tunnel endpoints 454b and 456b. In the illustrative example, first tunnel 452a is established between eNB 416a and SGW 420. Accordingly, first tunnel 452a includes a first tunnel endpoint 454a corresponding to an S1-U address of eNB 416a (referred to herein as the eNB S1-U address), and second tunnel endpoint 456a corresponding to an S1-U address of SGW 420 (referred to herein as the SGW S1-U address). Likewise, second tunnel 452b includes first tunnel endpoint 454b corresponding to an S5-U address of SGW 420 (referred to herein as the SGW S5-U address), and second tunnel endpoint 456b corresponding to an S5-U address of PGW 426 (referred to herein as the PGW S5-U address).

In at least some embodiments, first tunnel solution 450 is referred to as a two tunnel solution, e.g., according to the GPRS Tunneling Protocol User Plane (GTPv1-U based), as described in 3GPP specification TS 29.281, incorporated herein in its entirety. It is understood that one or more tunnels are permitted between each set of tunnel end points. For example, each subscriber can have one or more tunnels, e.g., one for each PDP context that they have active, as well as possibly having separate tunnels for specific connections with different quality of service requirements, and so on.

An example of second tunnel solution 458 includes a single or direct tunnel 460 between tunnel endpoints 462 and 464. In the illustrative example, direct tunnel 460 is established between eNB 416a and PGW 426, without subjecting packet transfers to processing related to SGW 420. Accordingly, direct tunnel 460 includes first tunnel endpoint 462 corresponding to the eNB S1-U address, and second tunnel endpoint 464 corresponding to the PGW S5-U address. Packet data received at either end can be encapsulated into a payload and directed to the corresponding address of the other end of the tunnel. Such direct tunneling avoids processing, e.g., by SGW 420 that would otherwise relay packets between the same two endpoints, e.g., according to a protocol, such as the GTP-U protocol.

In some scenarios, direct tunneling solution 458 can forward user plane data packets between eNB 416a and PGW 426, by way of SGW 420. That is, SGW 420 can serve a relay function, by relaying packets between two tunnel endpoints 416a, 426. In other scenarios, direct tunneling solution 458 can forward user data packets between eNB 416a and PGW 426, by way of the Si U+interface, thereby bypassing SGW 420.

Generally, UE 414 can have one or more bearers at any one time. The number and types of bearers can depend on applications, default requirements, and so on. It is understood that the techniques disclosed herein, including the configuration, management and use of various tunnel solutions 450, 458, can be applied to the bearers on an individual bases. That is, if user data packets of one bearer, say a bearer associated with a VoIP service of UE 414, then the forwarding of all packets of that bearer are handled in a similar manner. Continuing with this example, the same UE 414 can have another bearer associated with it through the same eNB 416a. This other bearer, for example, can be associated with a relatively low rate data session forwarding user data packets through core network 404 simultaneously with the first bearer. Likewise, the user data packets of the other bearer are also handled in a similar manner, without necessarily following a forwarding path or solution of the first bearer. Thus, one of the bearers may be forwarded through direct tunnel 458; whereas, another one of the bearers may be forwarded through a two-tunnel solution 450.

Figure 5:
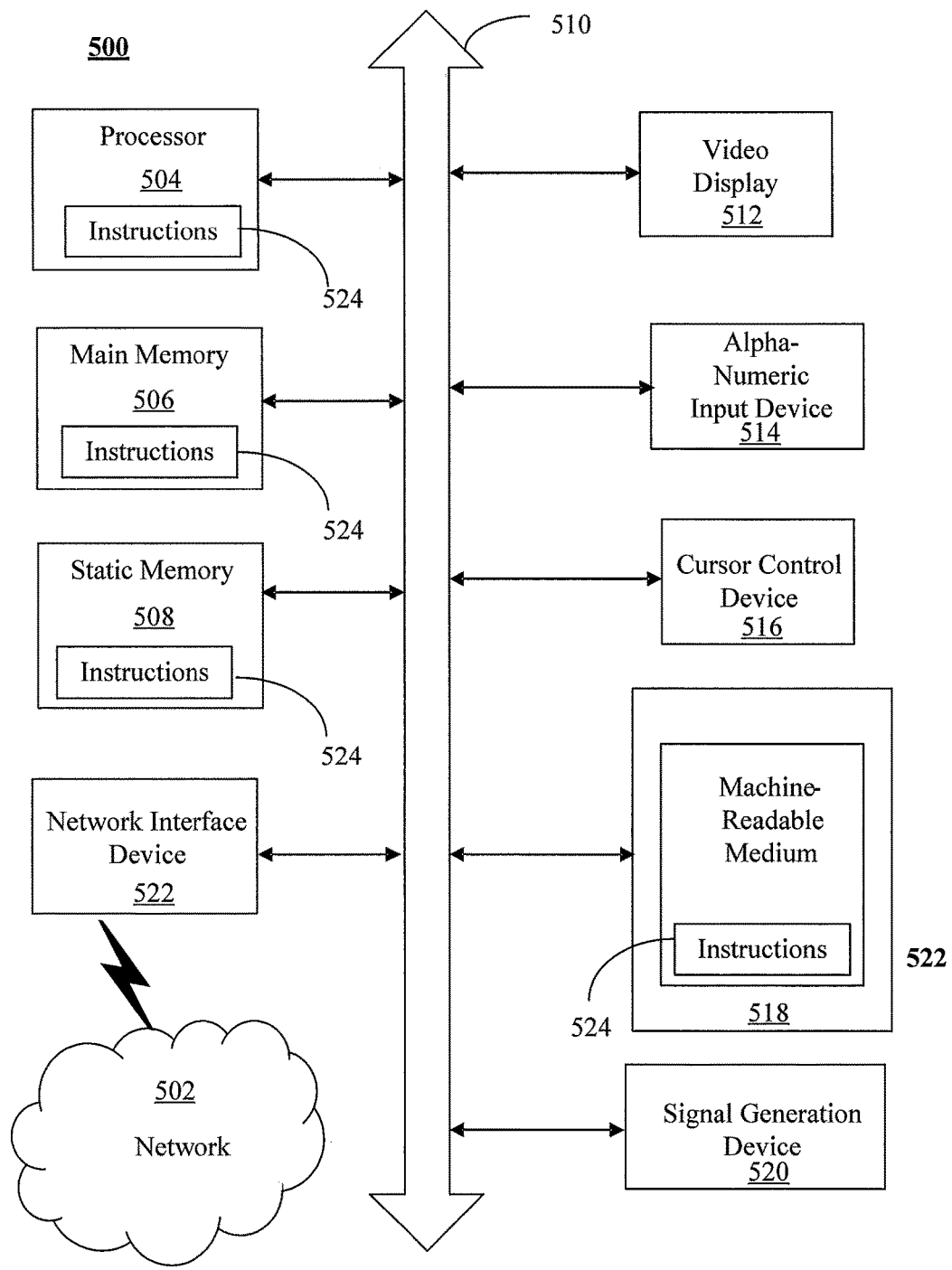
FIG. 5 depicts an example communication system that provides wireless telecommunication services over wireless communication networks.

FIG. 5 depicts an example diagrammatic representation of a machine in the form of a computer system 500 within which a set of instructions, when executed, may cause the machine to perform any one or more of the methods described above. One or more instances of the machine can operate, for example, as processor 302, UE 414, eNB 416, MME 418, SGW 420, HSS 422, PCRF 424, PGW 426 and other devices described herein. In some embodiments, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the embodiments described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium 524 on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

Figure 6:
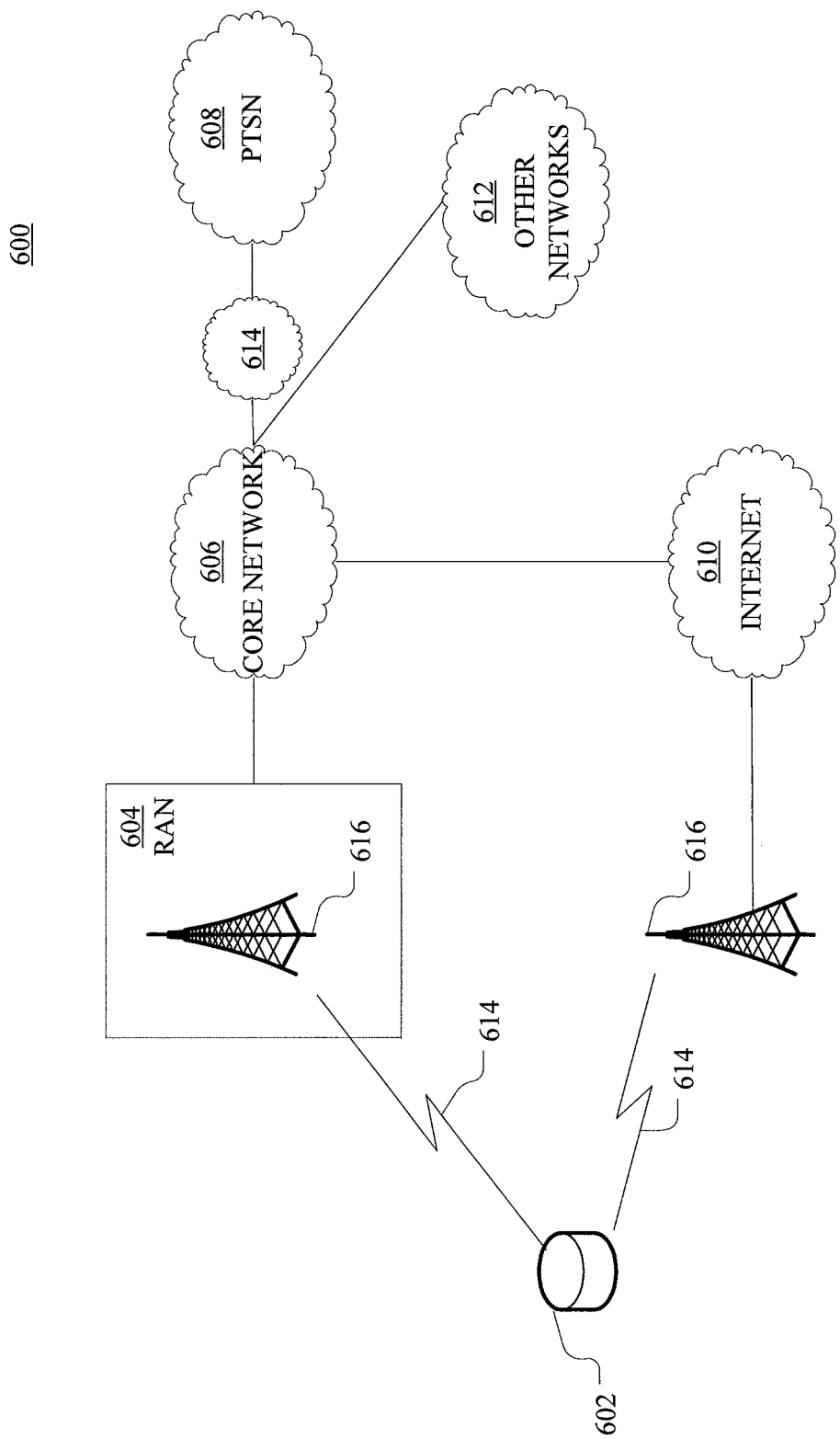
FIG. 6 is a diagram of an example telecommunications system in which the disclosed methods and processes may be implemented.

As shown in FIG. 6, telecommunication system 600 may include wireless transmit/receive units (WTRUs) 602, a RAN 604, a core network 606, a public switched telephone network (PSTN) 608, the Internet 610, or other networks 612, though it will be appreciated that the disclosed examples contemplate any number of WTRUs, base stations, networks, or network elements. Each WTRU 602 may be any type of device configured to operate or communicate in a wireless environment. For example, a WTRU may comprise a mobile device, a network device, or the like, or any combination thereof. By way of example, WTRUs 602 may be configured to transmit or receive wireless signals and may include a UE, a mobile station, a mobile device, a fixed or mobile subscriber unit, a pager, a cellular telephone, a PDA, a smartphone, a laptop, a netbook, a personal computer, a wireless sensor, consumer electronics, or the like. WTRUs 602 may be configured to transmit or receive wireless signals over an air interface 614.

Telecommunication system 600 may also include one or more base stations 616. Each of base stations 616 may be any type of device configured to wirelessly interface with at least one of the WTRUs 602 to facilitate access to one or more communication networks, such as core network 606, PTSN 608, Internet 610, or other networks 612. By way of example, base stations 616 may be a base transceiver station (BTS), a Node-B, an eNode B, a Home Node B, a Home eNode B, a site controller, an access point (AP), a wireless router, or the like. While base stations 616 are each depicted as a single element, it will be appreciated that base stations 616 may include any number of interconnected base stations or network elements.

RAN 604 may include one or more base stations 616, along with other network elements (not shown), such as a base station controller (BSC), a radio network controller (RNC), or relay nodes. One or more base stations 616 may be configured to transmit or receive wireless signals within a particular geographic region, which may be referred to as a cell (not shown). The cell may further be divided into cell sectors. For example, the cell associated with base station 616 may be divided into three sectors such that base station 616 may include three transceivers: one for each sector of the cell. In another example, base station 616 may employ multiple-input multiple-output (MIMO) technology and, therefore, may utilize multiple transceivers for each sector of the cell.

Base stations 616 may communicate with one or more of WTRUs 602 over air interface 614, which may be any suitable wireless communication link (e.g., RF, microwave, infrared (IR), ultraviolet (UV), or visible light). Air interface 614 may be established using any suitable radio access technology (RAT).

More specifically, as noted above, telecommunication system 600 may be a multiple access system and may employ one or more channel access schemes, such as CDMA, TDMA, FDMA, OFDMA, SC-FDMA, or the like. For example, base station 616 in RAN 604 and WTRUs 602 connected to RAN 604 may implement a radio technology such as Universal Mobile Telecommunications System (UMTS) Terrestrial Radio Access (UTRA) that may establish air interface 614 using wideband CDMA (WCDMA). WCDMA may include communication protocols, such as High-Speed Packet Access (HSPA) or Evolved HSPA (HSPA+). HSPA may include High-Speed Downlink Packet Access (HSDPA) or High-Speed Uplink Packet Access (HSUPA).

As another example base station 616 and WTRUs 602 that are connected to RAN 604 may implement a radio technology such as Evolved UMTS Terrestrial Radio Access (E-UTRA), which may establish air interface 614 using LTE or LTE-Advanced (LTE-A).

Optionally base station 616 and WTRUs 602 connected to RAN 604 may implement radio technologies such as IEEE 602.16 (i.e., Worldwide Interoperability for Microwave Access (WiMAX)), CDMA2000, CDMA2000 1×CDMA2000 EV-DO, Interim Standard 2000 (IS-2000), Interim Standard 95 (IS-95), Interim Standard 856 (IS-856), GSM, Enhanced Data rates for GSM Evolution (EDGE), GSM EDGE (GERAN), or the like.

Base station 616 may be a wireless router, Home Node B, Home eNode B, or access point, for example, and may utilize any suitable RAT for facilitating wireless connectivity in a localized area, such as a place of business, a home, a vehicle, a campus, or the like. For example, base station 616 and associated WTRUs 602 may implement a radio technology such as IEEE 602.11 to establish a wireless local area network (WLAN). As another example, base station 616 and associated WTRUs 602 may implement a radio technology such as IEEE 602.15 to establish a wireless personal area network (WPAN). In yet another example, base station 616 and associated WTRUs 602 may utilize a cellular-based RAT (e.g., WCDMA, CDMA2000, GSM, LTE, LTE-A, etc.) to establish a picocell or femtocell. As shown in FIG. 6, base station 616 may have a direct connection to Internet 610. Thus, base station 616 may not be required to access Internet 610 via core network 606.

RAN 604 may be in communication with core network 606, which may be any type of network configured to provide voice, data, applications, and/or voice over internet protocol (VoIP) services to one or more WTRUs 602. For example, core network 606 may provide call control, billing services, mobile location-based services, pre-paid calling, Internet connectivity, video distribution or high-level security functions, such as user authentication. Although not shown in FIG. 6, it will be appreciated that RAN 604 or core network 606 may be in direct or indirect communication with other RANs that employ the same RAT as RAN 604 or a different RAT. For example, in addition to being connected to RAN 604, which may be utilizing an E-UTRA radio technology, core network 606 may also be in communication with another RAN (not shown) employing a GSM radio technology.

Core network 606 may also serve as a gateway for WTRUs 602 to access PSTN 608, Internet 610, or other networks 612. PSTN 608 may include circuit-switched telephone networks that provide plain old telephone service (POTS). For LTE core networks, core network 606 may use IMS core 614 to provide access to PSTN 608. Internet 610 may include a global system of interconnected computer networks or devices that use common communication protocols, such as the transmission control protocol (TCP), user datagram protocol (UDP), or IP in the TCP/IP internet protocol suite. Other networks 612 may include wired or wireless communications networks owned or operated by other service providers. For example, other networks 612 may include another core network connected to one or more RANs, which may employ the same RAT as RAN 604 or a different RAT.

Some or all WTRUs 602 in telecommunication system 600 may include multi-mode capabilities. That is, WTRUs 602 may include multiple transceivers for communicating with different wireless networks over different wireless links. For example, one or more WTRUs 602 may be configured to communicate with base station 616, which may employ a cellular-based radio technology, and with base station 616, which may employ an IEEE 802 radio technology.

Figure 7:
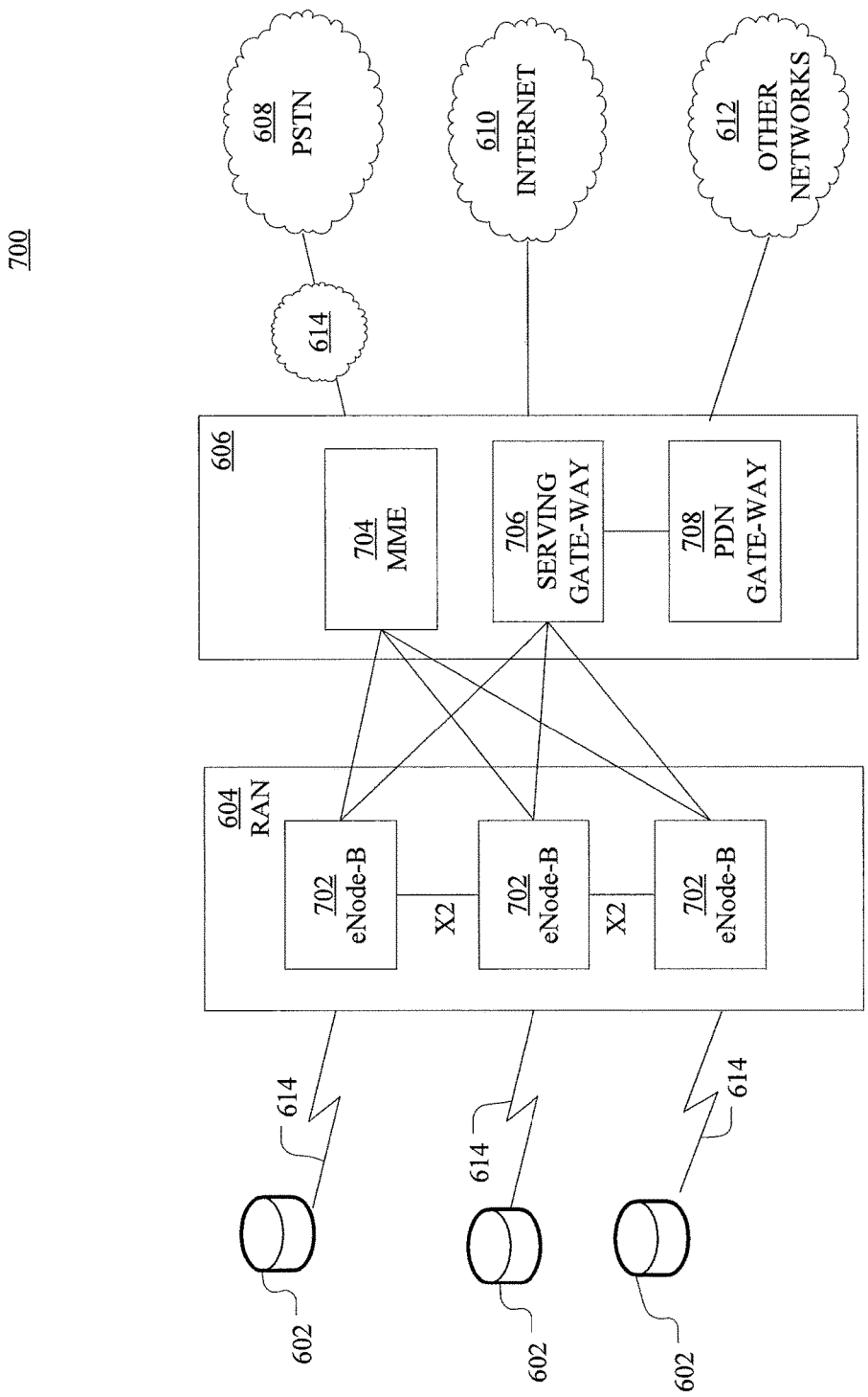
FIG. 7 is an example system diagram of a radio access network and a core network.

FIG. 7 is an example system 100 including RAN 604 and core network 606. As noted above, RAN 604 may employ an E-UTRA radio technology to communicate with WTRUs 602 over air interface 614. RAN 604 may also be in communication with core network 606.

RAN 604 may include any number of eNode-Bs 702 while remaining consistent with the disclosed technology. One or more eNode-Bs 702 may include one or more transceivers for communicating with the WTRUs 602 over air interface 614. Optionally, eNode-Bs 702 may implement MIMO technology. Thus, one of eNode-Bs 702, for example, may use multiple antennas to transmit wireless signals to, or receive wireless signals from, one of WTRUs 602.

Each of eNode-Bs 702 may be associated with a particular cell (not shown) and may be configured to handle radio resource management decisions, handover decisions, scheduling of users in the uplink or downlink, or the like. As shown in FIG. 7 eNode-Bs 702 may communicate with one another over an X2 interface.

Core network 606 shown in FIG. 7 may include a mobility management gateway or entity (MME) 704, a serving gateway 706, or a packet data network (PDN) gateway 708. While each of the foregoing elements are depicted as part of core network 606, it will be appreciated that any one of these elements may be owned or operated by an entity other than the core network operator.

MME 704 may be connected to each of eNode-Bs 702 in RAN 604 via an S1 interface and may serve as a control node. For example, MME 704 may be responsible for authenticating users of WTRUs 602, bearer activation or deactivation, selecting a particular serving gateway during an initial attach of WTRUs 602, or the like. MME 704 may also provide a control plane function for switching between RAN 604 and other RANs (not shown) that employ other radio technologies, such as GSM or WCDMA.

Serving gateway 706 may be connected to each of eNode-Bs 702 in RAN 604 via the S1 interface. Serving gateway 706 may generally route or forward user data packets to or from the WTRUs 602. Serving gateway 706 may also perform other functions, such as anchoring user planes during inter-eNode B handovers, triggering paging when downlink data is available for WTRUs 602, managing or storing contexts of WTRUs 602, or the like.

Serving gateway 706 may also be connected to PDN gateway 708, which may provide WTRUs 602 with access to packet-switched networks, such as Internet 610, to facilitate communications between WTRUs 602 and IP-enabled devices.

Core network 606 may facilitate communications with other networks. For example, core network 606 may provide WTRUs 602 with access to circuit-switched networks, such as PSTN 608, such as through IMS core 614, to facilitate communications between WTRUs 602 and traditional landline communications devices. In addition, core network 606 may provide the WTRUs 602 with access to other networks 612, which may include other wired or wireless networks that are owned or operated by other service providers.

Figure 8:
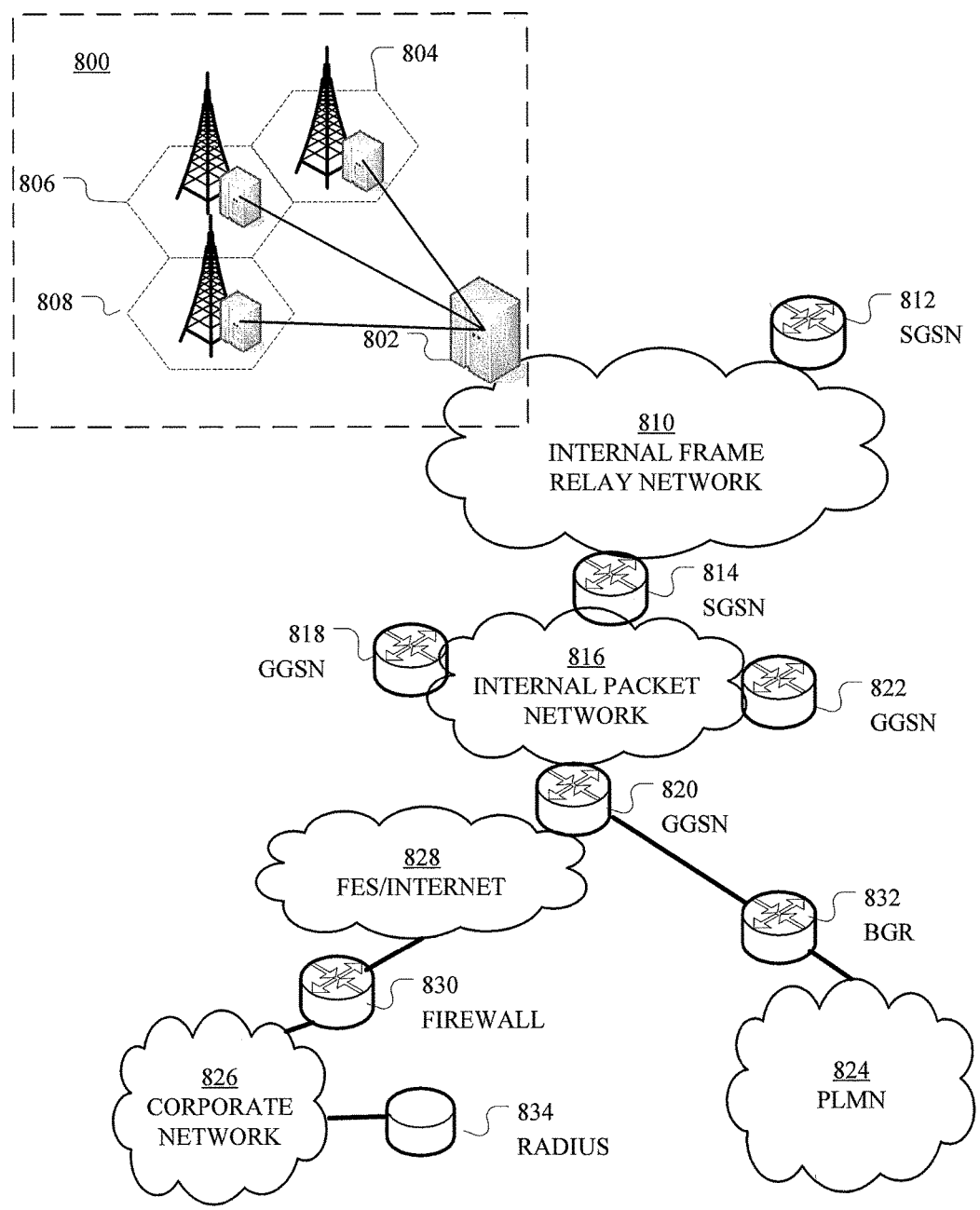
FIG. 8 depicts an overall block diagram of an example packet-based mobile cellular network environment, such as a general packet radio service (GPRS) network.

FIG. 8 depicts an overall block diagram of an example packet-based mobile cellular network environment, such as a GPRS network as described herein. In the example packet-based mobile cellular network environment shown in FIG. 8, there are a plurality of base station subsystems (BSS) 800 (only one is shown), each of which comprises a base station controller (BSC) 802 serving a plurality of BTSs, such as BTSs 804, 806, 808. BTSs 804, 806, 808 are the access points where users of packet-based mobile devices become connected to the wireless network. In example fashion, the packet traffic originating from mobile devices is transported via an over-the-air interface to BTS 808, and from BTS 808 to BSC 802. Base station subsystems, such as BSS 800, are a part of internal frame relay network 810 that can include a service GPRS support nodes (SGSN), such as SGSN 812 or SGSN 814. Each SGSN 812, 814 is connected to an internal packet network 816 through which SGSN 812, 814 can route data packets to or from a plurality of gateway GPRS support nodes (GGSN) 818, 820, 822. As illustrated, SGSN 814 and GGSNs 818, 820, 822 are part of internal packet network 816. GGSNs 818, 820, 822 mainly provide an interface to external IP networks such as PLMN 824, corporate intranets/internets 826, or Fixed-End System (FES) or the public Internet 828. As illustrated, subscriber corporate network 826 may be connected to GGSN 820 via a firewall 830. PLMN 824 may be connected to GGSN 820 via a boarder gateway router (BGR) 832. A Remote Authentication Dial-In User Service (RADIUS) server 834 may be used for caller authentication when a user calls corporate network 826.

Generally, there may be a several cell sizes in a network, referred to as macro, micro, pico, femto or umbrella cells. The coverage area of each cell is different in different environments. Macro cells can be regarded as cells in which the base station antenna is installed in a mast or a building above average roof top level. Micro cells are cells whose antenna height is under average roof top level. Micro cells are typically used in urban areas. Pico cells are small cells having a diameter of a few dozen meters. Pico cells are used mainly indoors. Femto cells have the same size as pico cells, but a smaller transport capacity. Femto cells are used indoors, in residential or small business environments. On the other hand, umbrella cells are used to cover shadowed regions of smaller cells and fill in gaps in coverage between those cells.

Figure 9:
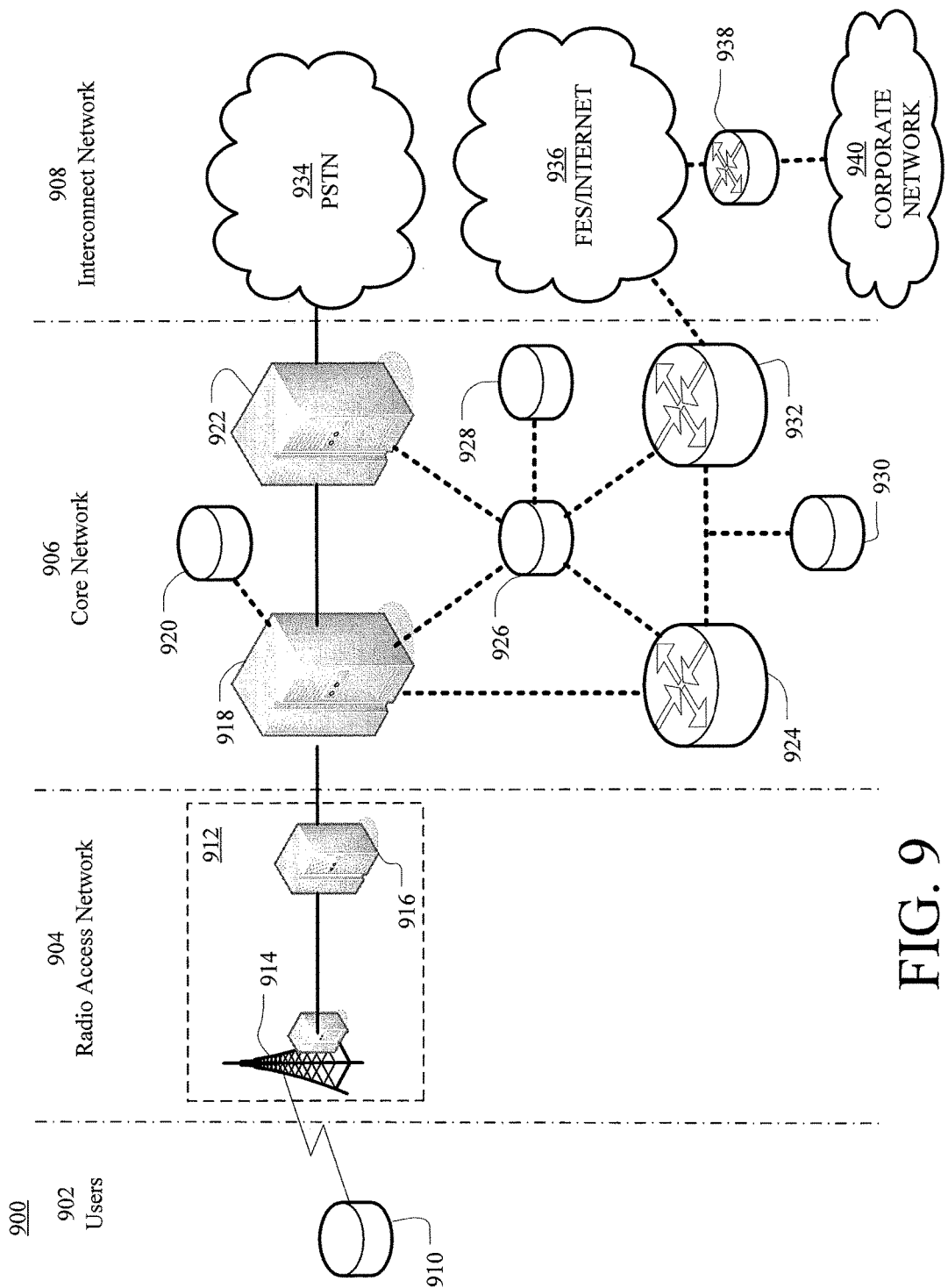
FIG. 9 illustrates an example architecture of a GPRS network.

FIG. 9 illustrates an architecture of a typical GPRS network 900 as described herein. The architecture depicted in FIG. 9 may be segmented into four groups: users 902, RAN 904, core network 906, and interconnect network 908. Users 902 comprise a plurality of end users, who each may use one or more devices 910. Note that device 910 is referred to as a mobile subscriber (MS) in the description of network shown in FIG. 9. In an example, device 910 comprises a communications device (e.g., a mobile device, a mobile positioning center, a network device, a detected device or the like, or any combination thereof). Radio access network 904 comprises a plurality of BSSs such as BSS 912, which includes a BTS 914 and a BSC 916. Core network 906 may include a host of various network elements. As illustrated in FIG. 9, core network 906 may comprise MSC 918, service control point (SCP) 920, gateway MSC (GMSC) 922, SGSN 924, home location register (HLR) 926, authentication center (AuC) 928, domain name system (DNS) server 930, and GGSN 932. Interconnect network 908 may also comprise a host of various networks or other network elements. As illustrated in FIG. 9, interconnect network 908 comprises a PSTN 934, an FES/Internet 936, a firewall 1038, or a corporate network 940.

An MSC can be connected to a large number of BSCs. At MSC 918, for instance, depending on the type of traffic, the traffic may be separated in that voice may be sent to PSTN 934 through GMSC 922, or data may be sent to SGSN 924, which then sends the data traffic to GGSN 932 for further forwarding.

When MSC 918 receives call traffic, for example, from BSC 916, it sends a query to a database hosted by SCP 920, which processes the request and issues a response to MSC 918 so that it may continue call processing as appropriate.

HLR 926 is a centralized database for users to register to the GPRS network. HLR 926 stores static information about the subscribers such as the International Mobile Subscriber Identity (IMSI), subscribed services, or a key for authenticating the subscriber. HLR 926 also stores dynamic subscriber information such as the current location of the MS. Associated with HLR 926 is AuC 928, which is a database that contains the algorithms for authenticating subscribers and includes the associated keys for encryption to safeguard the user input for authentication.

In the following, depending on context, "mobile subscriber" or "MS" sometimes refers to the end user and sometimes to the actual portable device, such as a mobile device, used by an end user of the mobile cellular service. When a mobile subscriber turns on his or her mobile device, the mobile device goes through an attach process by which the mobile device attaches to an SGSN of the GPRS network. In FIG. 9, when MS 910 initiates the attach process by turning on the network capabilities of the mobile device, an attach request is sent by MS 910 to SGSN 924. The SGSN 924 queries another SGSN, to which MS 910 was attached before, for the identity of MS 910. Upon receiving the identity of MS 910 from the other SGSN, SGSN 924 requests more information from MS 910. This information is used to authenticate MS 910 together with the information provided by HLR 926. Once verified, SGSN 924 sends a location update to HLR 926 indicating the change of location to a new SGSN, in this case SGSN 924. HLR 926 notifies the old SGSN, to which MS 910 was attached before, to cancel the location process for MS 910. HLR 926 then notifies SGSN 924 that the location update has been performed. At this time, SGSN 924 sends an Attach Accept message to MS 910, which in turn sends an Attach Complete message to SGSN 924.

Next, MS 910 establishes a user session with the destination network, corporate network 940, by going through a Packet Data Protocol (PDP) activation process. Briefly, in the process, MS 910 requests access to the Access Point Name (APN), for example, UPS.com, and SGSN 924 receives the activation request from MS 910. SGSN 924 then initiates a DNS query to learn which GGSN 932 has access to the UPS.com APN. The DNS query is sent to a DNS server within core network 906, such as DNS server 930, which is provisioned to map to one or more GGSNs in core network 906. Based on the APN, the mapped GGSN 932 can access requested corporate network 940. SGSN 924 then sends to GGSN 932 a Create PDP Context Request message that contains necessary information. GGSN 932 sends a Create PDP Context Response message to SGSN 924, which then sends an Activate PDP Context Accept message to MS 910.

Once activated, data packets of the call made by MS 910 can then go through RAN 904, core network 906, and interconnect network 908, in a particular FES/Internet 936 and firewall 1038, to reach corporate network 940.

Figure 10:
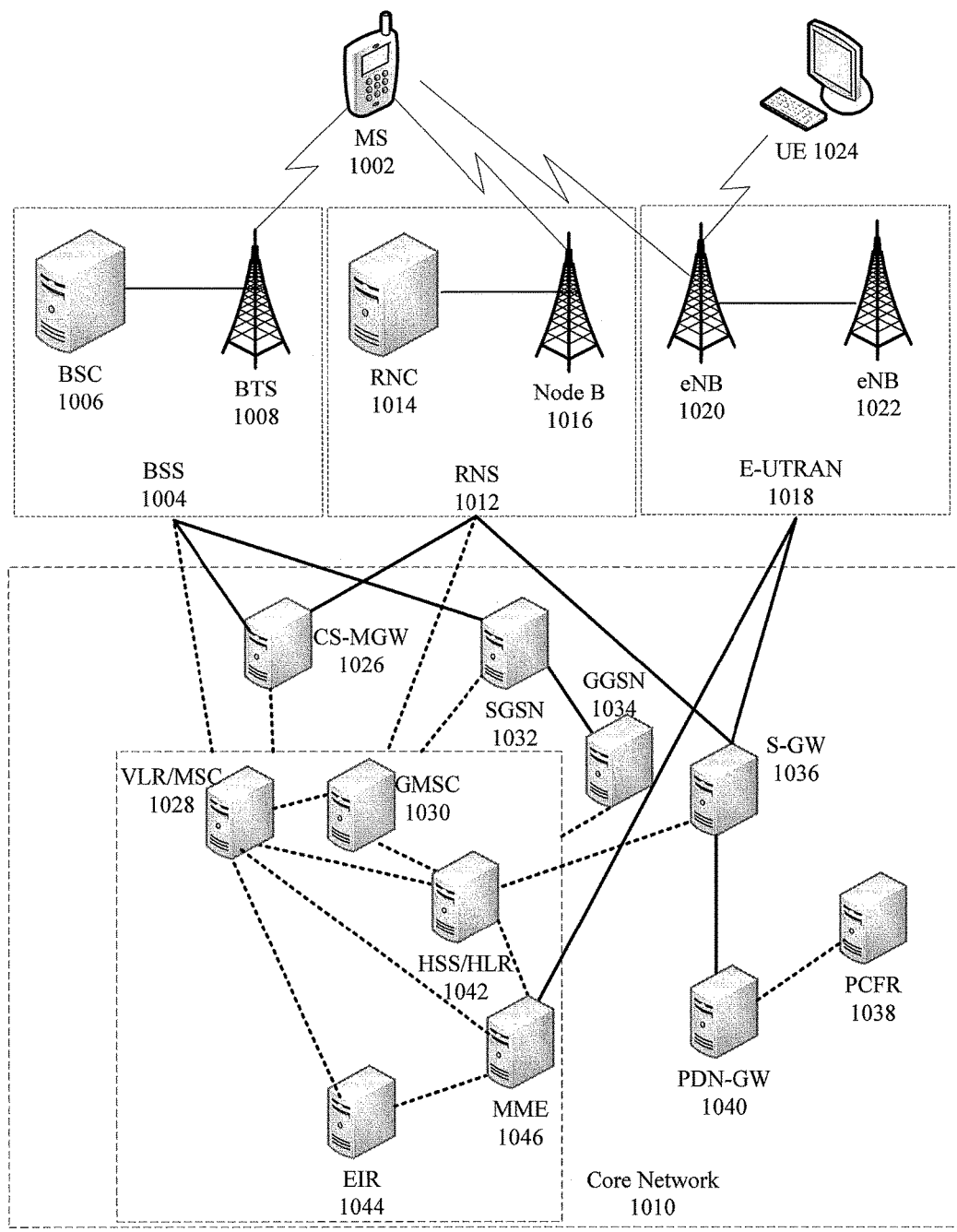
FIG. 10 is a block diagram of an example public land mobile network (PLMN).

FIG. 10 illustrates a PLMN block diagram view of an example architecture that may be replaced by a telecommunications system. In FIG. 10, solid lines may represent user traffic signals, and dashed lines may represent support signaling. MS 1002 is the physical equipment used by the PLMN subscriber. For example, a network device, another electronic device, the like, or any combination thereof may serve as MS 1002. MS 1002 may be one of, but not limited to, a cellular telephone, a cellular telephone in combination with another electronic device or any other wireless mobile communication device.

MS 1002 may communicate wirelessly with BSS 1004. BSS 1004 contains BSC 1006 and a BTS 1008. BSS 1004 may include a single BSC 1006/BTS 1008 pair (base station) or a system of BSC/BTS pairs that are part of a larger network. BSS 1004 is responsible for communicating with MS 1002 and may support one or more cells. BSS 1004 is responsible for handling cellular traffic and signaling between MS 1002 and a core network 1010. Typically, BSS 1004 performs functions that include, but are not limited to, digital conversion of speech channels, allocation of channels to mobile devices, paging, or transmission/reception of cellular signals.

Additionally, MS 1002 may communicate wirelessly with RNS 1012. RNS 1012 contains a Radio Network Controller (RNC) 1014 and one or more Nodes B 1016. RNS 1012 may support one or more cells. RNS 1012 may also include one or more RNC 1014/Node B 1016 pairs or alternatively a single RNC 1014 may manage multiple Nodes B 1016. RNS 1012 is responsible for communicating with MS 1002 in its geographically defined area. RNC 1014 is responsible for controlling Nodes B 1016 that are connected to it and is a control element in a UMTS radio access network. RNC 1014 performs functions such as, but not limited to, load control, packet scheduling, handover control, security functions, or controlling MS 1002 access to core network 1010.

An E-UTRA Network (E-UTRAN) 1018 is a RAN that provides wireless data communications for MS 1002 and UE 1024. E-UTRAN 1018 provides higher data rates than traditional UMTS. It is part of the LTE upgrade for mobile networks, and later releases meet the requirements of the International Mobile Telecommunications (IMT) Advanced and are commonly known as a 4G networks. E-UTRAN 1018 may include of series of logical network components such as E-UTRAN Node B (eNB) 1020 and E-UTRAN Node B (eNB) 1022. E-UTRAN 1018 may contain one or more eNBs. User equipment (UE) 1024 may be any mobile device capable of connecting to E-UTRAN 1018 including, but not limited to, a personal computer, laptop, mobile device, wireless router, or other device capable of wireless connectivity to E-UTRAN 1018. The improved performance of the E-UTRAN 1018 relative to a typical UMTS network allows for increased bandwidth, spectral efficiency, and functionality including, but not limited to, voice, high-speed applications, large data transfer or IPTV, while still allowing for full mobility.

Typically MS 1002 may communicate with any or all of BSS 1004, RNS 1012, or E-UTRAN 1018. In a illustrative system, each of BSS 1004, RNS 1012, and E-UTRAN 1018 may provide MS 1002 with access to core network 1010. Core network 1010 may include of a series of devices that route data and communications between end users. Core network 1010 may provide network service functions to users in the circuit switched (CS) domain or the packet switched (PS) domain. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The circuit-switched MGW function (CS-MGW) 1026 is part of core network 1010, and interacts with VLR/MSC server 1028 and GMSC server 1030 in order to facilitate core network 1010 resource control in the CS domain. Functions of CS-MGW 1026 include, but are not limited to, media conversion, bearer control, payload processing or other mobile network processing such as handover or anchoring. CS-MGW 1026 may receive connections to MS 1002 through BSS 1004 or RNS 1012.

SGSN 1032 stores subscriber data regarding MS 1002 in order to facilitate network functionality. SGSN 1032 may store subscription information such as, but not limited to, the IMSI, temporary identities, or PDP addresses. SGSN 1032 may also store location information such as, but not limited to, GGSN address for each GGSN 1034 where an active PDP exists. GGSN 1034 may implement a location register function to store subscriber data it receives from SGSN 1032 such as subscription or location information.

Serving gateway (S-GW) 1036 is an interface which provides connectivity between E-UTRAN 1018 and core network 1010. Functions of S-GW 1036 include, but are not limited to, packet routing, packet forwarding, transport level packet processing, or user plane mobility anchoring for inter-network mobility. PCRF 1038 uses information gathered from P-GW 1036, as well as other sources, to make applicable policy and charging decisions related to data flows, network resources or other network administration functions. PDN gateway (PDN-GW) 1040 may provide user-to-services connectivity functionality including, but not limited to, GPRS/EPC network anchoring, bearer session anchoring and control, or IP address allocation for PS domain connections.

HSS 1042 is a database for user information and stores subscription data regarding MS 1002 or UE 1024 for handling calls or data sessions. Networks may contain one HSS 1042 or more if additional resources are required. Example data stored by HSS 1042 include, but is not limited to, user identification, numbering or addressing information, security information, or location information. HSS 1042 may also provide call or session establishment procedures in both the PS and CS domains.

VLR/MSC Server 1028 provides user location functionality. When MS 1002 enters a new network location, it begins a registration procedure. A MSC server for that location transfers the location information to the VLR for the area. A VLR and MSC server may be located in the same computing environment, as is shown by VLR/MSC server 1028, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for MS 1002 registration or procedures for handover of MS 1002 to a different section of core network 1010. GMSC server 1030 may serve as a connection to alternate GMSC servers for other MSs in larger networks.

EIR 1044 is a logical element which may store the IMEI for MS 1002. User equipment may be classified as either "white listed" or "black listed" depending on its status in the network. If MS 1002 is stolen and put to use by an unauthorized user, it may be registered as "black listed" in EIR 1044, preventing its use on the network. A MME 1046 is a control node which may track MS 1002 or UE 1024 if the devices are idle. Additional functionality may include the ability of MME 1046 to contact idle MS 1002 or UE 1024 if retransmission of a previous session is required.

As described herein, a telecommunications system wherein management and control utilizing a software designed network (SDN) and a simple IP are based, at least in part, on user equipment, may provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple machine-to-machine (M2M) devices—through enhanced wireless management.

While examples of a telecommunications system in which emergency alerts can be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes an device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled, or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

What is claimed is:

1. A system comprising a non-transitory computer readable medium storing instructions that when executed by a processor effectuate operation of a network broker, the network broker comprising:

a shared access interface configured to receive condition data provided by a plurality of shared access system elements monitoring a private network, wherein the received condition data includes shared access data that facilitates frequency allocation, and wherein the plurality of shared access system elements are failsafes that corroborate frequency reallocation or availability in response to one or more sources of the shared access data failing to transmit information within a predetermined time period;

a network communication interface configured to communicate with a public network and the private network, wherein the public network operates using a dedicated frequency band that is continuously available, and wherein the private network operates using a shared frequency band that is available based on the condition data;

a network broker database configured to store a network element profile for a shared access network element configured to operate on the public network and the private network, wherein the shared access network element has a home network distinct from the public network and the private network; and a shared access processing server configured to authenticate the shared access network element to the public network and the private network based on the network element profile.

2. The system of claim 1, wherein the shared access processing server is configured to: analyze the condition data to generate a network command; and provide the network command to the shared access network elements based on the network element profile and using the network communication interface.

3. The system of claim 2, wherein the shared access system elements are sensors configured to detect radio traffic over the shared frequency band.

4. The system of claim 2, wherein the shared access interface is configured to communicate with the shared access system elements.

5. The system of claim 4, wherein the shared access interface is configured to receive information from the shared access system elements at least in part by way of an application programming interface of a shared access system.

6. The system of claim 2, further comprising a security module of the network broker, the security module enforces security protocols against traffic from at least the shared access system elements.

7. The system of claim 2, wherein the network command is configured to allow or disallow use of the shared frequency band by the shared access network element based on the condition data.

8. The system of claim 7, wherein the condition data is data concerning use of the shared frequency band by a priority incumbent.

9. The system of claim 1, wherein the network communication interface is configured to receive a request from the shared access network elements.

10. The system of claim 9, wherein the shared access processing server is further configured to analyze the request to generate a request response.

11. The system of claim 10, wherein the request response creates the network element profile.

12. The system of claim 1, wherein the network communication interface is configured to communicate with another network broker.

13. The system of claim 1, further comprising a shared access roaming agent configured to locate at least one network having an internet gateway.

14. A computer-implemented method comprising executing, using a processor, instructions stored on a non-transitory computer-readable media, wherein the instructions when executed by the processor effectuate operations comprising:

receiving condition data from a plurality of shared access system elements at a network broker, wherein the received condition data includes shared access data;

providing the shared access data from the plurality of the shared access system element that facilitates frequency allocation, wherein the plurality of the shared access system elements are failsafes that corroborate frequency reallocation or availability in response to one or more sources of the shared access data failing to transmit information within a predetermined time period;

receiving a shared access request from a network element among shared access network elements configured to operate on a public network and a private network, wherein the shared access request is to associate the network element with at least one of the public network and the private network, wherein the network element has a home network distinct from the public network and the private network, wherein the public network operates using a dedicated frequency band that is continuously available, and wherein the private network operates using a shared frequency band that is available based on the condition data;

searching a network broker database for a network element profile associated with the network element; and authenticating the network element to at least one of the public network and the private network based on the network element profile.

15. The method of claim 14, further comprising:

generating a network command based on analysis of the condition data and the network element profile.

16. The computer-implemented method of claim 15, further comprising:

determining from the analysis of the condition data and the network element profile that the condition data impacts the network element among the shared access network elements; and providing the network command to the network element.

17. The computer-implemented method of claim 14, further comprising:

creating the network element profile, wherein the network element profile was not found during searching.

18. The computer-implemented method of claim 14, wherein the network broker database is outside the home network.

19. The computer-implemented method of claim 14, wherein the shared access request includes a request to modify the network element profile.

20. A system, comprising:

means for receiving condition data from a plurality of shared access system elements at a network broker, wherein the received condition data includes shared access data;

means for providing the shared access data from the plurality of the shared access system element that facilitates frequency allocation, wherein the plurality of the shared access system elements are failsafes that corroborate frequency reallocation or availability in response to one or more sources of the shared access data failing to transmit information within a predetermined time period;

means for receiving a shared access request from a network element among shared access network elements configured to operate on a public network and a private network, wherein the shared access request is to associate the network element with at least one of the public network and the private network, wherein the network element has a home network distinct from the public network and the private network, wherein the public network operates using a dedicated frequency band that is continuously available, and wherein the private network operates using a shared frequency band that is available based on the condition data;

means for searching a network broker database for a network element profile associated with the network element; and means for authenticating the network element to at least one of the public network and the private network based on the network element profile.

* * * * *